United States Patent
Anderson

(10) Patent No.: US 12,432,388 B2
(45) Date of Patent: Sep. 30, 2025

(54) SUPERRESOLUTION-ENABLED (SRE) VIDEO CODEC

(71) Applicant: Dimension, Inc., Las Vegas, NV (US)

(72) Inventor: James B Anderson, Minneapolis, MN (US)

(73) Assignee: Dimension, Inc., Las Vegas, NV (US)

( * ) Notice: Subject to any disclaimer, the term of this patent is extended or adjusted under 35 U.S.C. 154(b) by 213 days.

(21) Appl. No.: 17/928,842

(22) PCT Filed: Jun. 1, 2021

(86) PCT No.: PCT/US2021/035075
§ 371 (c)(1),
(2) Date: Apr. 4, 2023

(87) PCT Pub. No.: WO2021/247459
PCT Pub. Date: Dec. 9, 2021

(65) Prior Publication Data
US 2023/0232050 A1   Jul. 20, 2023

Related U.S. Application Data

(60) Provisional application No. 63/188,852, filed on May 14, 2021, provisional application No. 63/068,993, (Continued)

(51) Int. Cl.
*H04N 19/86*   (2014.01)
*H04N 19/117*   (2014.01)
(Continued)

(52) U.S. Cl.
CPC .......... *H04N 19/86* (2014.11); *H04N 19/117* (2014.11); *H04N 19/167* (2014.11); *H04N 19/172* (2014.11);

(58) Field of Classification Search
CPC .. H04N 19/117; H04N 19/167; H04N 19/172; H04N 19/86; H04N 19/132; H04N 19/59; H04N 19/80
(Continued)

(56) References Cited

U.S. PATENT DOCUMENTS 6,163,308 A * 12/2000 Cavallerano ............. H04N 5/21
345/32
2007/0217713 A1* 9/2007 Milanfar ............... G06T 3/4053
382/299

(Continued)

FOREIGN PATENT DOCUMENTS

WO    WO-2010144406 A1 * 12/2010 ........... H04N 19/132

*Primary Examiner* — Behrooz M Senfi
(74) *Attorney, Agent, or Firm* — Todd Partners, P.C.

(57) ABSTRACT

Systems and methods for transmitting source video (305) over a bandwidth-limited network (350). First, high frequency spectral content of the video is encoded into layer-1 data files (330). In parallel, frames of the video are downsampled (342) and compressed (333) using a lossy CODEC, to define layer-2 data files (335a, 335b) with high-frequency spectral content removed therefrom. The layer-1 and layer-2 data files are interleaved (345a, 345b) and transmitted over the network and are smaller than conventional lossy CODEC compressed files. After receipt, the layer-1 and layer-2 data files are deinterleaved. The layer-2 data is decompressed (353) and upsampled (362) to create a preliminary reconstructed video. The high frequency spectral content is extracted (351) from the layer-1 data files, and photometric warp superresolution processing (370) restores the high frequency spectral content into the preliminary reconstructed video to generate a final, output video (395a, 395b) at resolution at or near the source video for display to a viewer at or downstream from the receiving location.

10 Claims, 13 Drawing Sheets

Related U.S. Application Data filed on Aug. 22, 2020, provisional application No. 63/032,722, filed on May 31, 2020.

(51) Int. Cl.
*H04N 19/167* (2014.01)
*H04N 19/172* (2014.01)

(58) Field of Classification Search
USPC .................................................. 375/240.02
See application file for complete search history.

(56) References Cited

U.S. PATENT DOCUMENTS

2019/0174992 A1\* 6/2019 Fujii .................... H04N 19/174
2019/0295282 A1\* 9/2019 Smolyanskiy ........ G01S 13/867
2020/0059670 A1\* 2/2020 Kiser ...................... H04N 9/77

\* cited by examiner

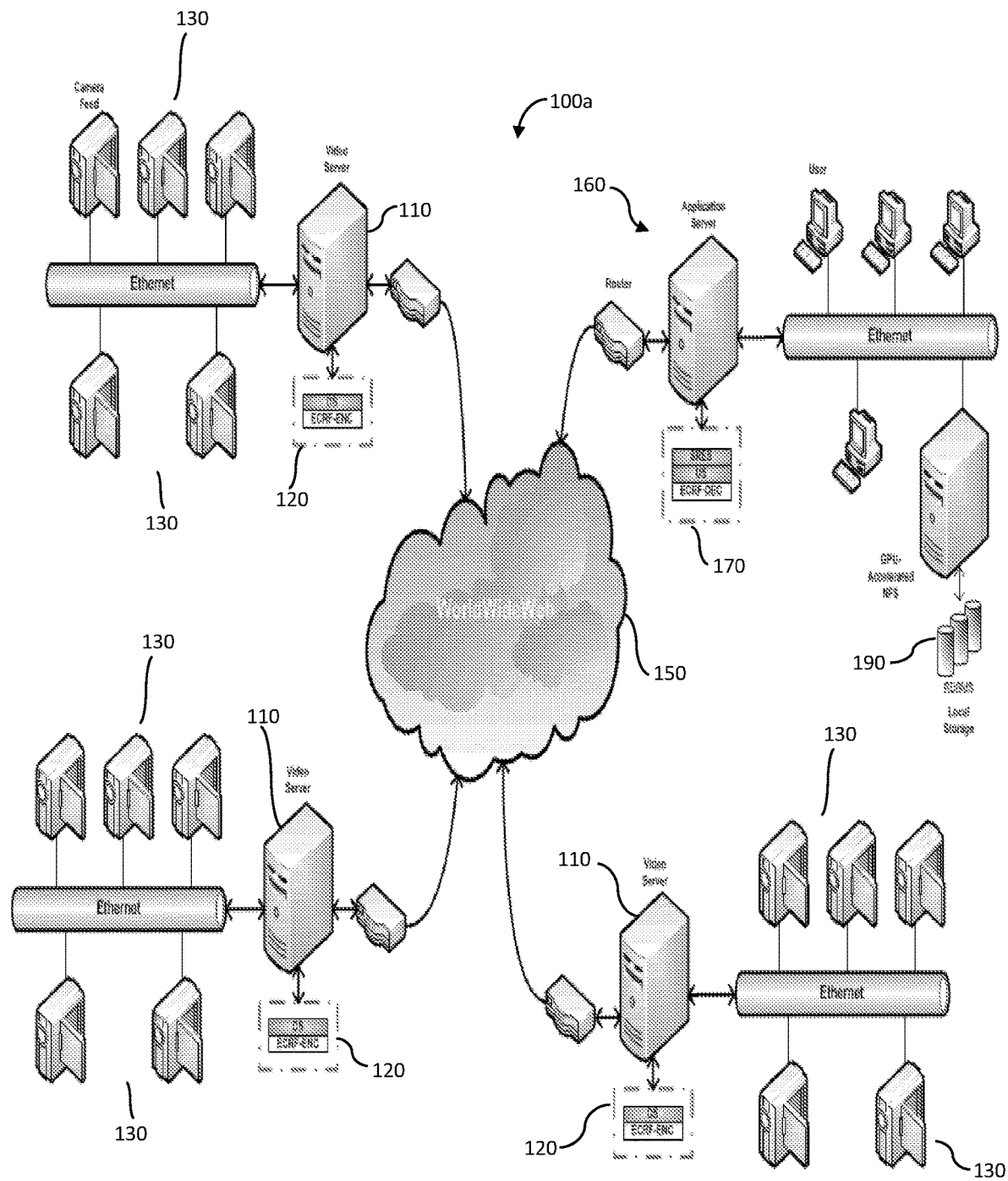
FIG. 1(a): Exemplary IoT VSS SRE/CODEC Implementation

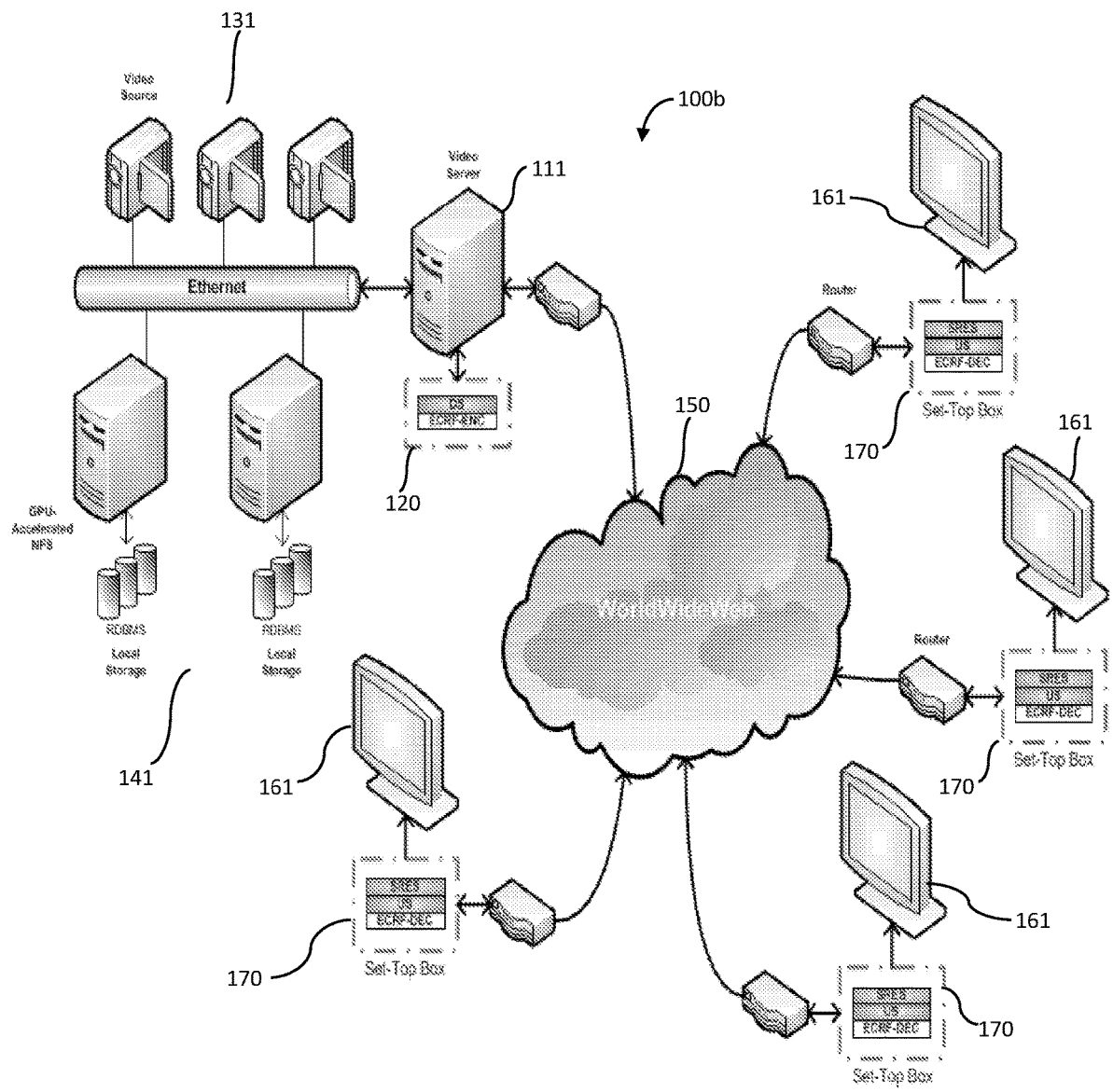
FIG. 1(b): Exemplary Internet Streaming Video SRE/CODEC Implementation

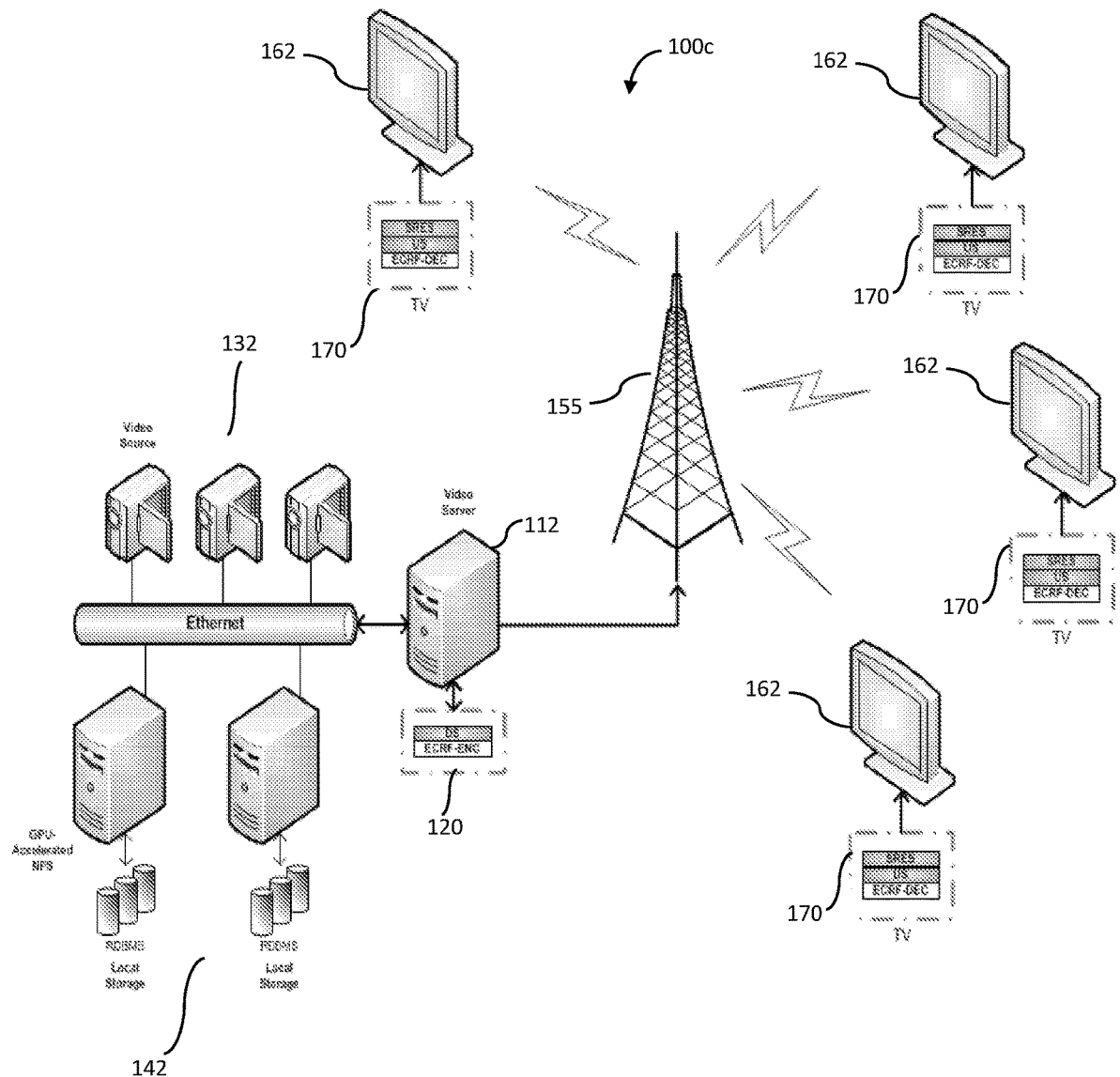
FIG. 1(c): Exemplary OTA Streaming Video SRE/CODEC Implementation

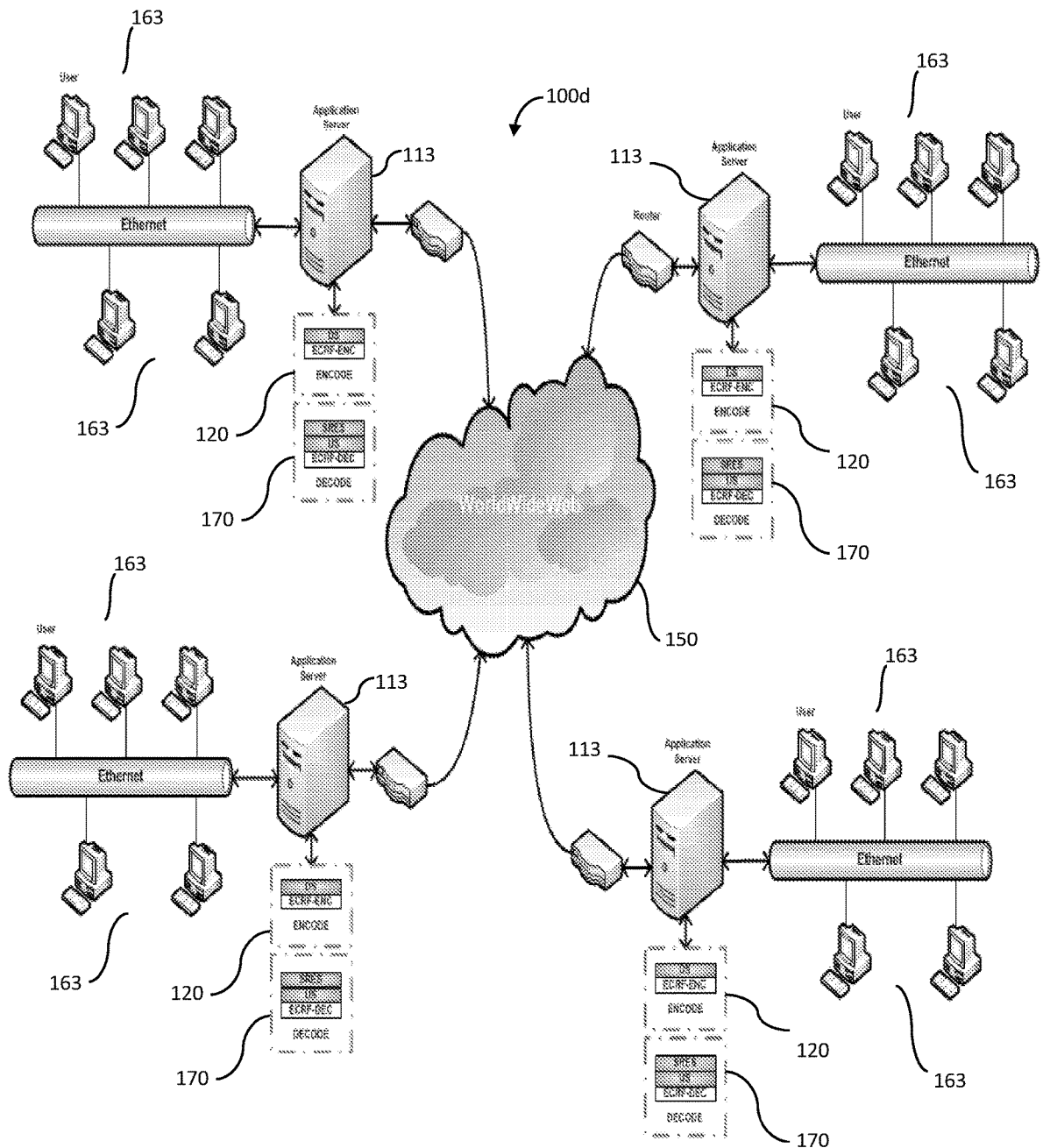
FIG. 1(d): Exemplary Video Conferencing System SRE/CODEC Implementation

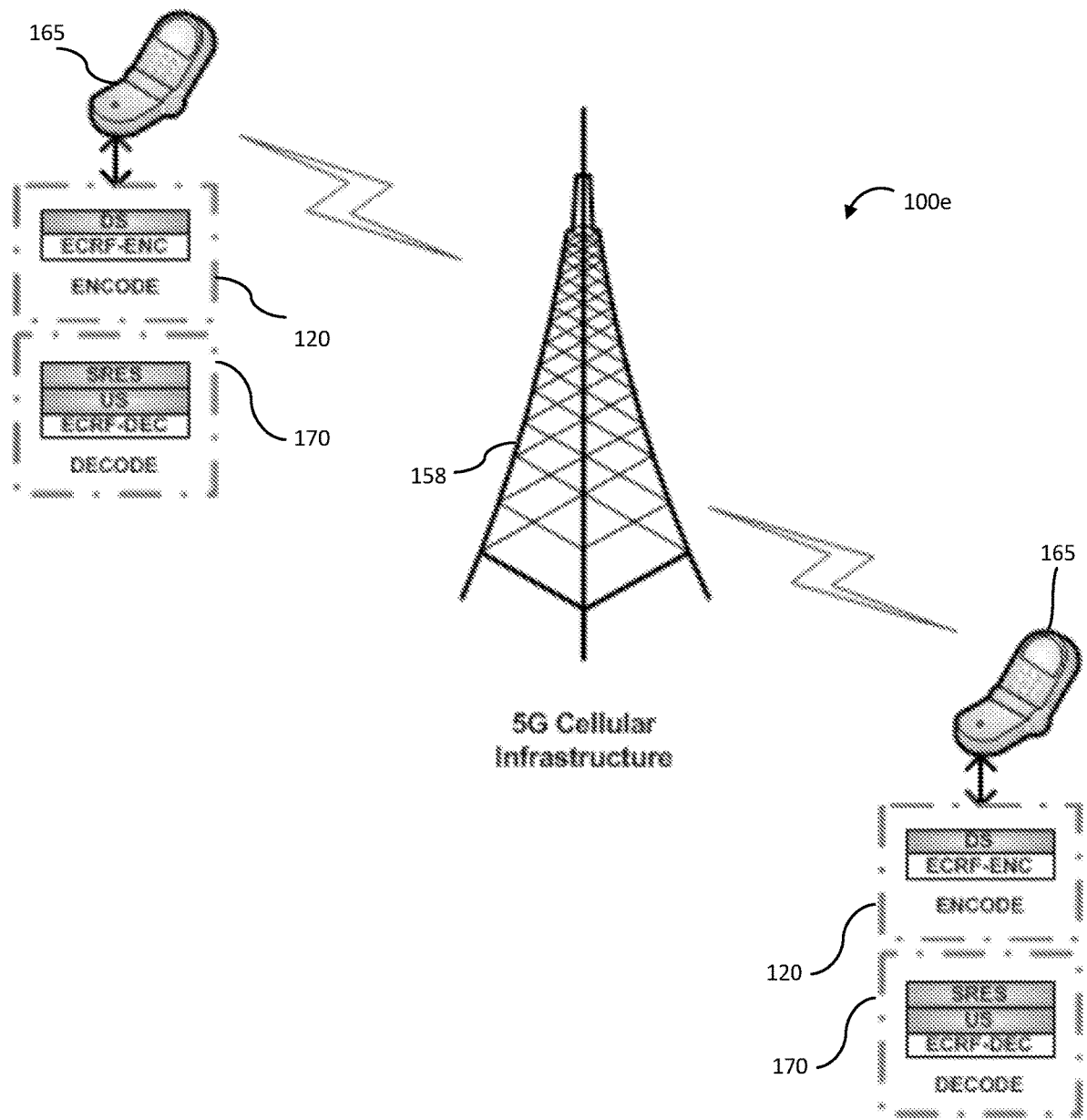
FIG. 1(e): Exemplary Video Telephony System SRE/CODEC Implementation

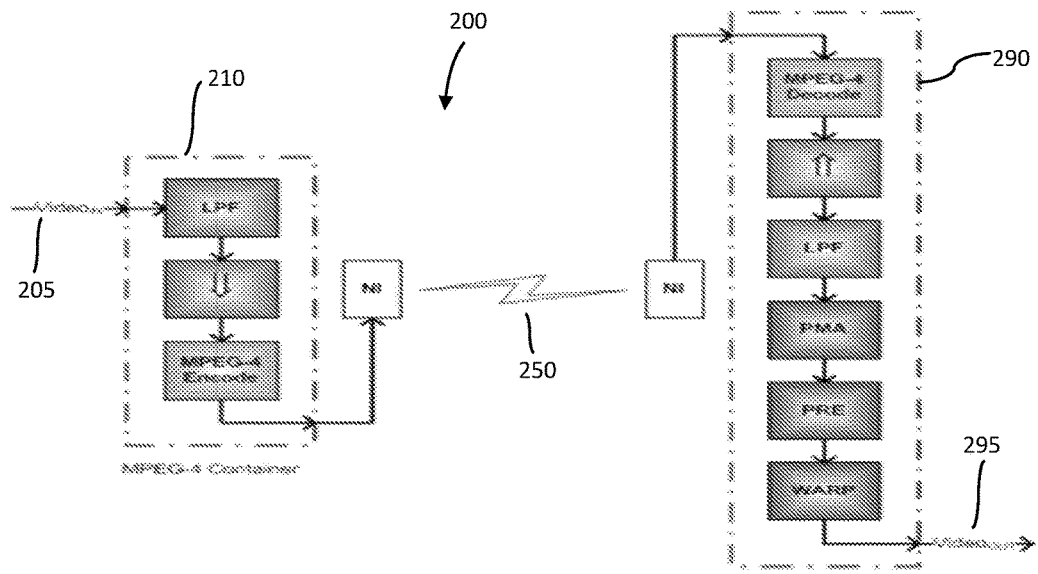
FIG. 2: 'Blind' SR/CODEC Model
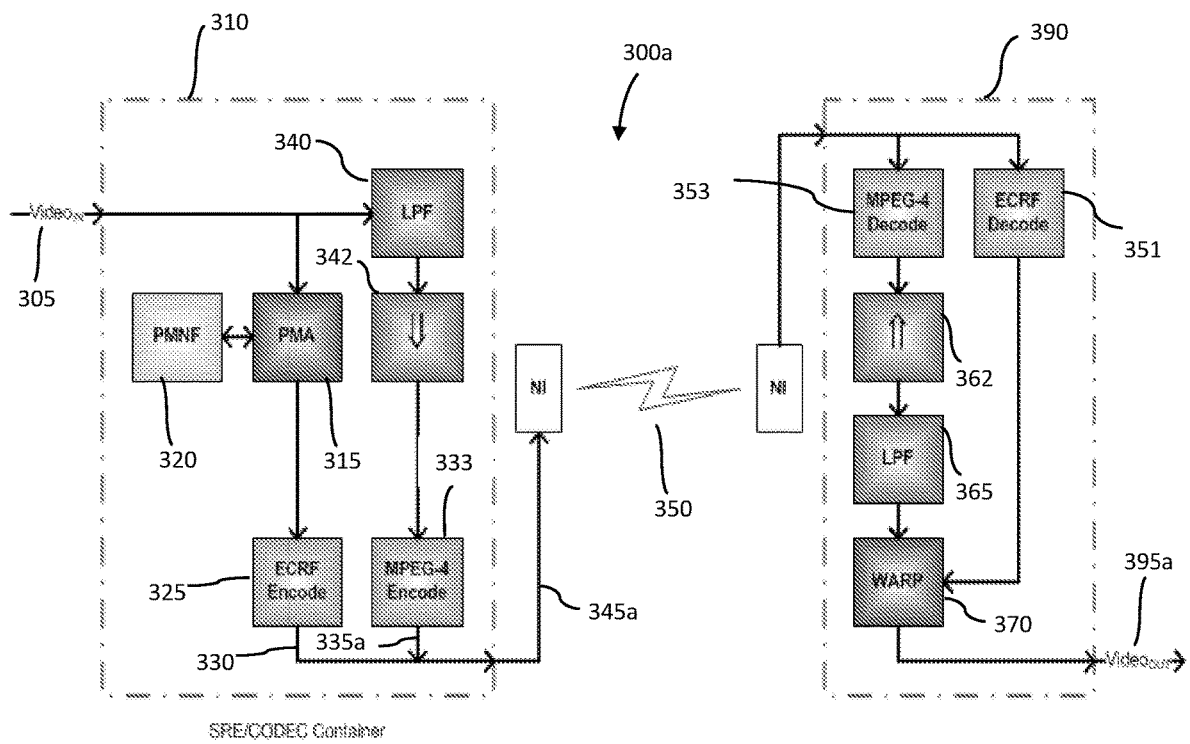
FIG. 3(a): Source-Encoded SR/CODEC Model (t-domain)

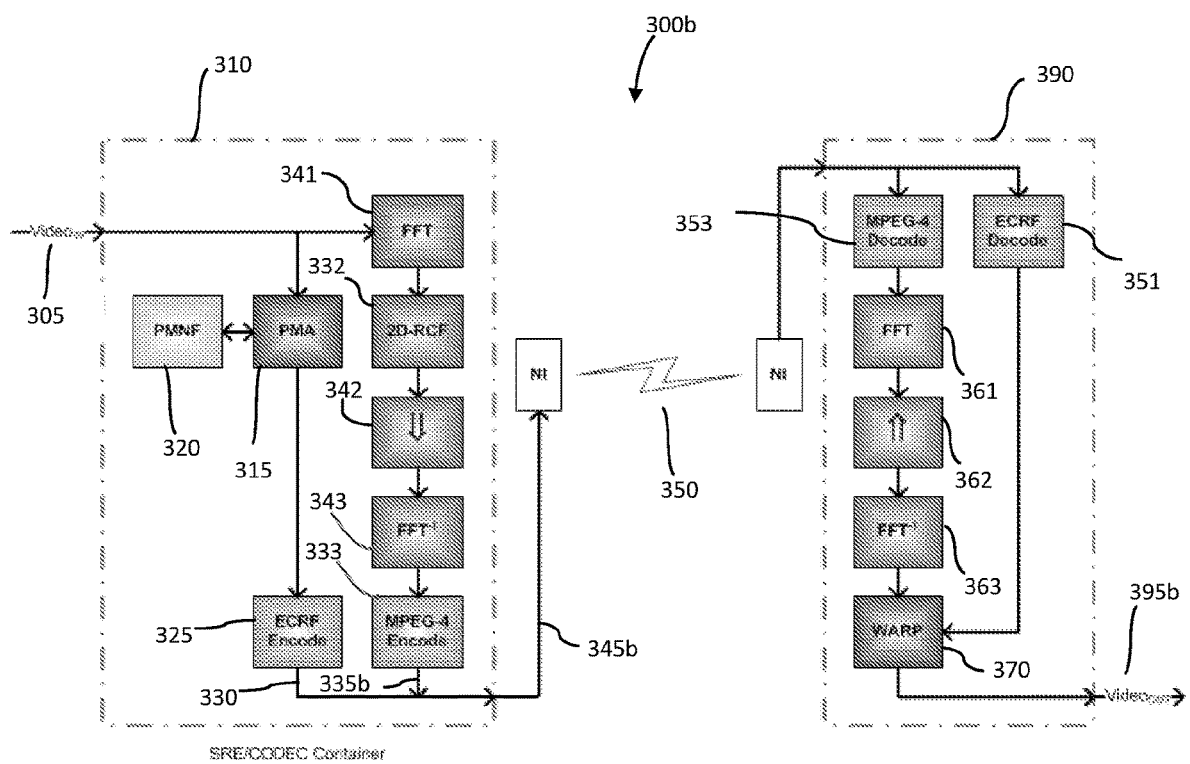
FIG. 3(b): Source-Encoded SR/CODEC Model (f-domain)

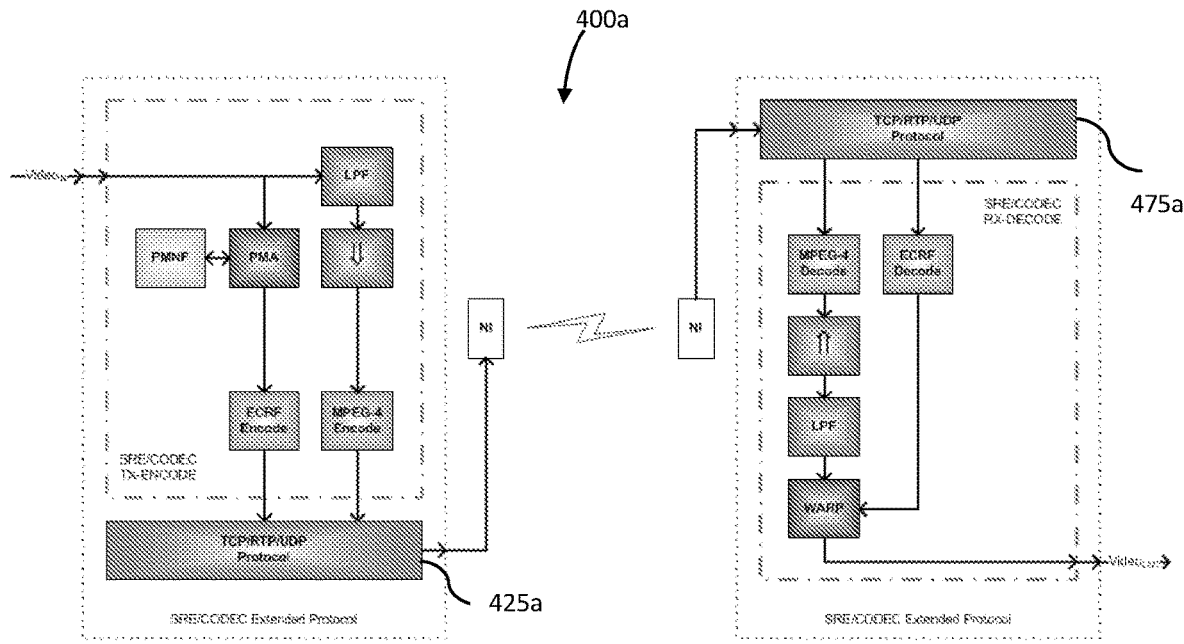
FIG. 4(a): Extended Networking Protocol for Source –Encoded SRE/CODEC (t-Domain)
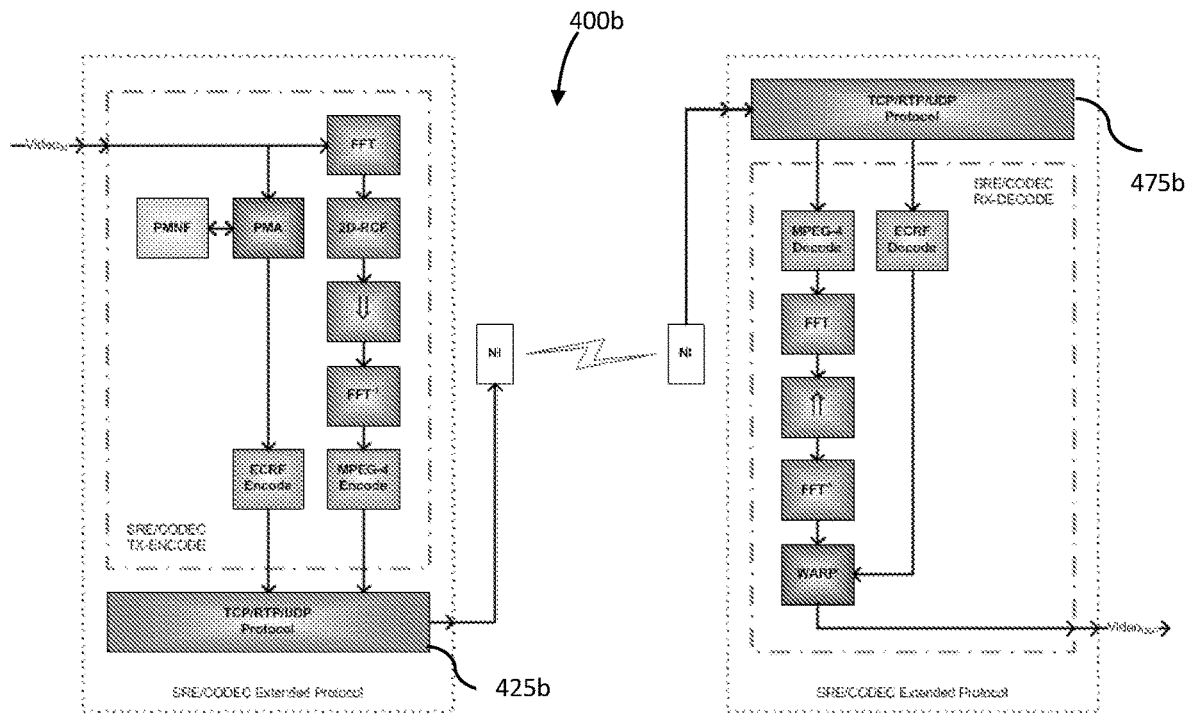
FIG. 4(b): Extended Networking Protocol for Source –Encoded SRE/CODEC (f-Domain)

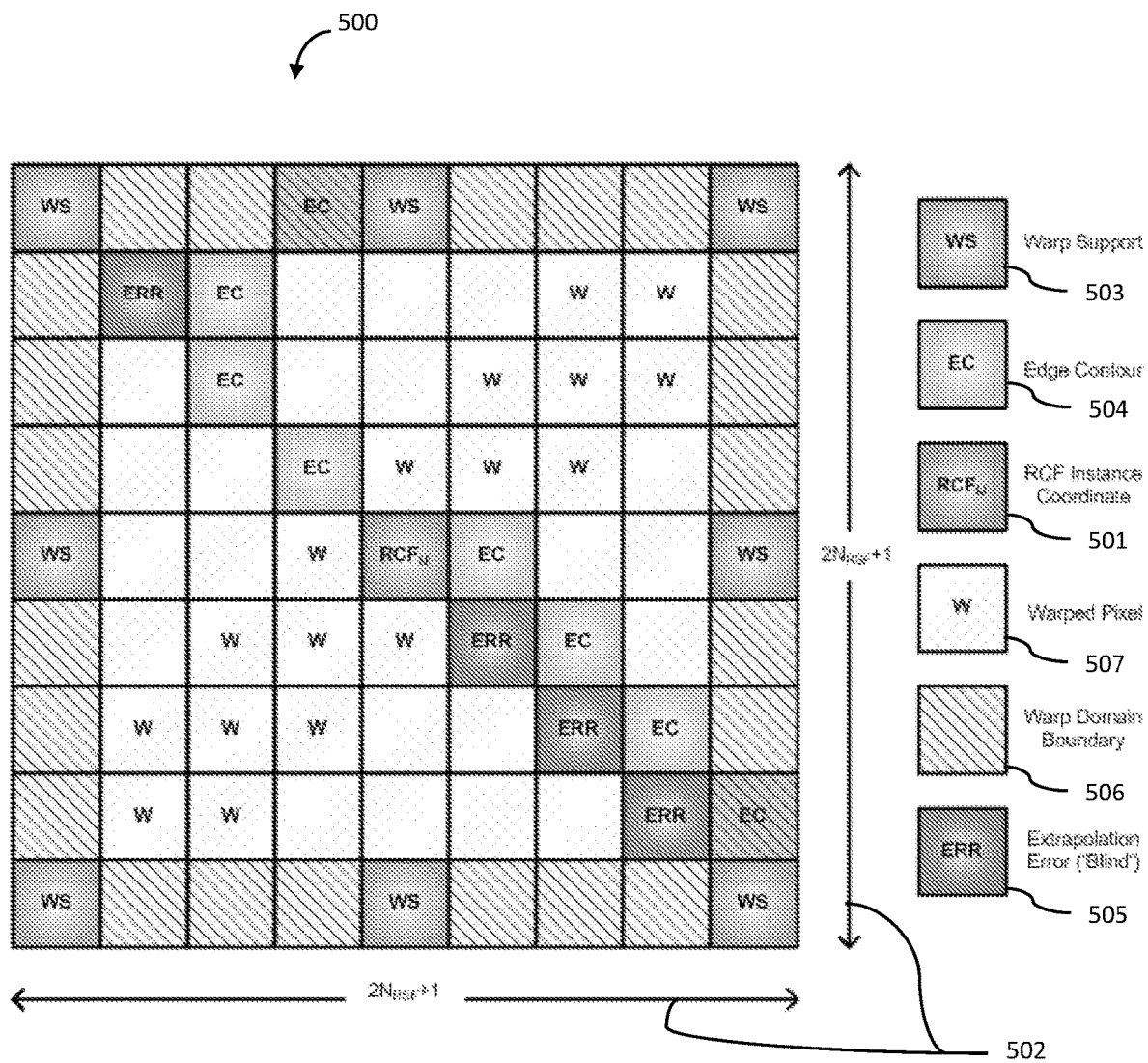
FIG. 5: Exemplary Source-Encoded SR/CODEC Warp-Domain

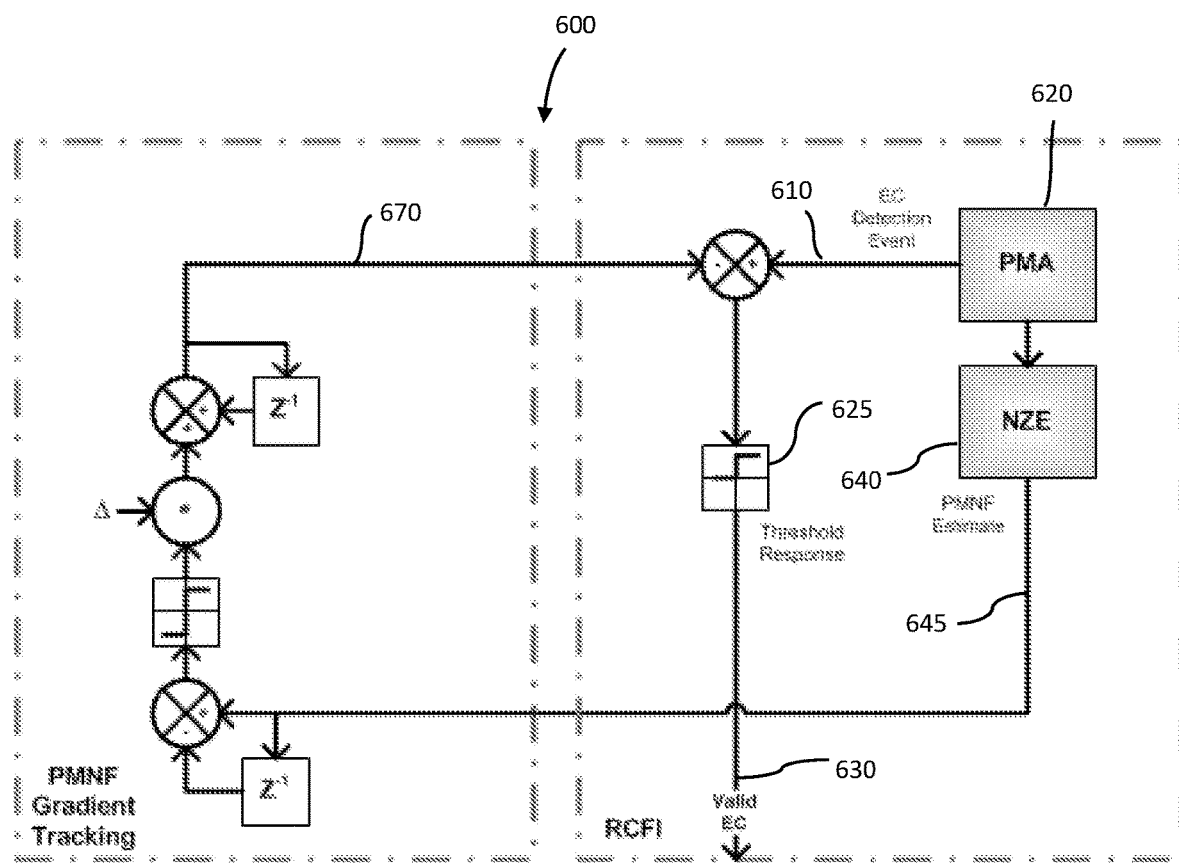
FIG. 6: Adaptive Edge-Contour Noise Thresholding Loop

FIG. 7: Source Frame (RGB/1080p)
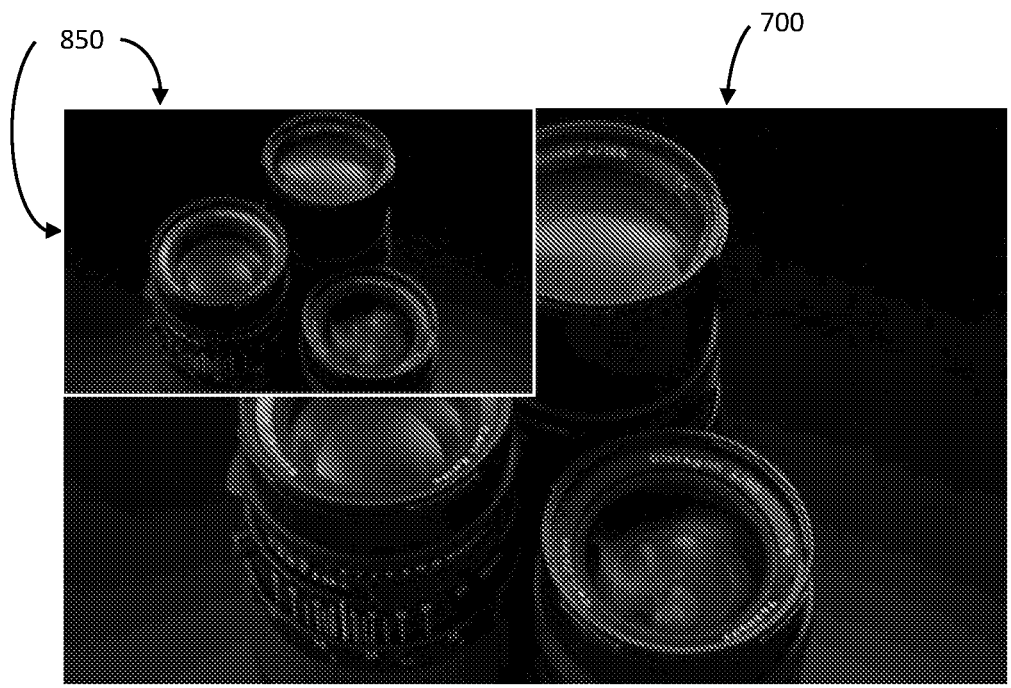
FIG. 8: '1/4-rate' Resampled Source (Insert)

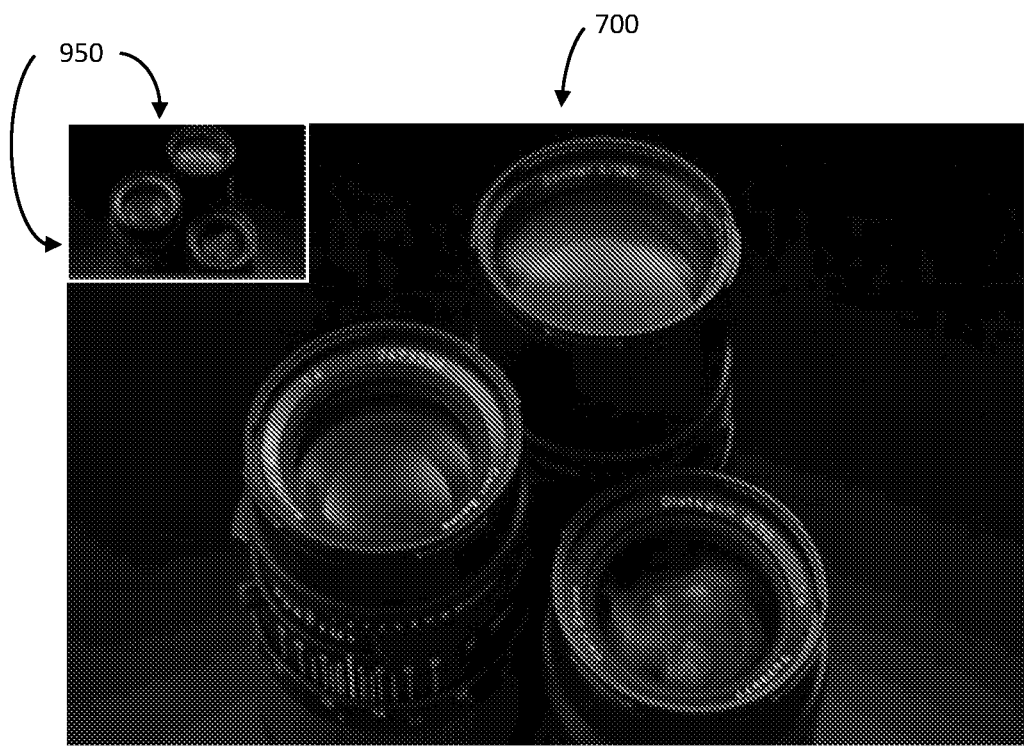
FIG. 9: '1/16-rate' Resampled Source (Insert)
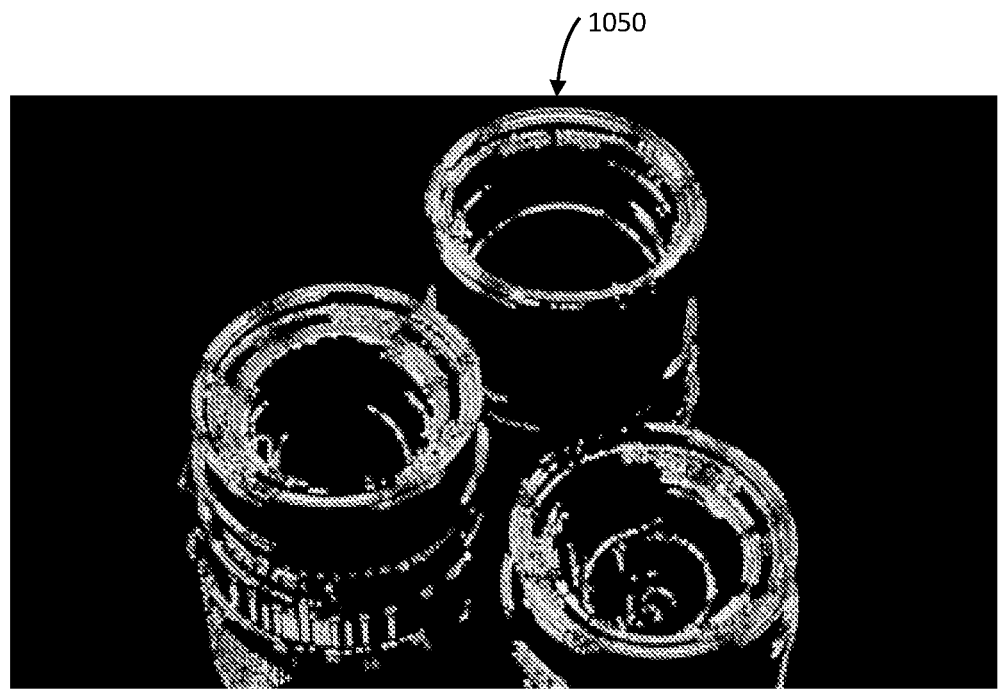
FIG. 10: Warp Loci Visualization ('$N_{RSF} = 4$')

FIG. 11: SRE/CODEC Output ('$N_{RSF} = 4$')
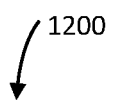
| $N_{RSF}$ | PSNR | $\Delta_{PSNR}$ | BRR | $\beta$ |
|---|---|---|---|---|
|  |  |  |  |  |
| 2 | 31.99 | 0.21 | 3.96:1 | 0.002 |
| 4 | 28.74 | 1.11 | 13.79:1 | 0.012 |
|  |  |  |  |  |
FIG. 12: SRE/CODEC Performance Summary Table

SUPERRESOLUTION-ENABLED (SRE) VIDEO CODEC

CROSS REFERENCE TO RELATED APPLICATION

This application claims priority benefit under 35 U.S.C. § 119(e) to U.S. Provisional Patent Application No. 63/032,722, entitled "Superresolution-Enabled Video CODEC," filed May 31, 2020, U.S. Provisional Patent Application No. 63/068,993, entitled "Improved Superresolution-Enabled (SRE) Video CODEC," filed Aug. 22, 2020, U.S. Provisional Patent Application No. 63/188,852, entitled "Super-Resolution (SR) IoT Bandwidth Reduction and Infrared Image Upscaling," filed May 14, 2021, and to U.S. Nonprovisional patent application Ser. No. 17/334,947, entitled "Improved Superresolution-Enabled (SRE) Video CODEC," filed May 31, 2021, all of which are hereby incorporated by reference in their entirety as if set forth in full herein.

FIELD OF THE INVENTION

The present inventions relate generally to systems, processes, devices, and implementing technologies providing multichannel video network transport, improved compression and upscaler functionality, and improved video CODEC performance and functionality.

BACKGROUND OF THE INVENTION

Terms used herein, and in related applications, include but are not limited to: nonlinear signal processing (NSP), photometric warp (p-Warp), reconstruction filter, single-frame superresolution (SFSR), superresolution (SR), superresolution-enabled (SRE) CODEC, video surveillance system (VSS), pattern manifold assembly (PMA), pattern manifold noise-floor (PMNF), video CODEC, additive white Gaussian noise (AWGN), bandwidth reduction ratio (BRR), discrete cosine (spectral) transform (cosine basis) (DCT), edge-contour reconstruction filter (ECRF), fast Fourier (spectral) transform (sine/cosine basis) (FFT), graphics processor unit (GPU), multi-frame superresolution (MFSR), network file system (NFS), non-local (spatiotemporal) filter (NLF), over-the-air (OTA), pattern manifold assembly (PMA), pattern recognition engine (PRE), power spectral density (PSD), peak signal-to-noise ratio (PSNR) image similarity measure, quality-of-result (QoR), raised-cosine filter (RCF), resample scale (zoom) factor (RSF), superresolution (super-Nyquist) image processing (SRES), video conferencing system (VCS), video telephony system (VTS), far-infrared (FIR) systems, thermal/far-infrared (T/FIR) systems, near infrared imaging (NIRI), image processing chain, multidimensional filter, nonlocal filter, spatiotemporal filters and spatiotemporal noise filters, thermal imaging, video denoise, minimum mean-square-error (MMSE), Wiener filter, focal-plane array (FPA) sensors, and optical coherence tomography (OCT).

It is well known that video transmission bandwidth demand exceeds network infrastructure capabilities in a number of market sectors incorporating video technologies. This circumstance is primarily due to: (i) increased diversity of software applications leveraging video transport capabilities, (ii) high costs that deter any infrastructure expansion that might be considered, and (iii) an expanding user-base for new products leveraging video transport. From a market development perspective, video transmission bandwidth limitations inherent to global network infrastructure, as it exists today, constitute a significant impediment to product innovation in the video products marketplace. The SRE/CODEC systems, processes, devices, and implementing technologies described herein are intended to address this problem by virtue of a more efficient use of available spectrum.

Currently, lossy CODECs, such as MPEG-4 and H.264/5, predominate in the video products marketplace. These CODECs have proven very successful but have reached technical limits in terms of compression performance. These limits result from the basic block-based/motion-compensated differential encoding mechanism being employed. In other words, with any generic video content, only so much exploitable spatial and temporal redundancy is present. There is thus an on-going need in the industry for improved CODECs that overcomes these limitations.

In preferred embodiments, the SRE/CODEC disclosed and described herein performs no differential encoding whatsoever, but instead employs a spatial encoding of a type very different from that of existing lossy CODECs—with the assumption of a scale-invariant edge-geometry model at a given Nyquist limit, edge-contour content is encoded within a low-bandwidth side-channel. With this encoding, spectra associated with edge-contours may then be discarded in the original image. The bandwidth savings then accrues based upon the fact that any discard of spatial frequencies associated with edge contours is equivalent to symbol-rate reduction (downsampling). This bandwidth savings is significant unto itself. However, the downsampled version of the original source is also available for a successive step of encoding using a lossy CODEC, and it is this combination of SRE/CODEC spatial encoding and lossy CODEC spatiotemporal encoding that exhibits a composite compression ratio as a product of the two component compression ratios.

At a fundamental level, the SRE/CODEC innovations disclosed and described herein introduce a new video system design-tradeoff whereby superresolution processing gain is exchanged for (video) transmission bandwidth. This tradeoff is advantageous in design of such systems where available bandwidth is constrained at a limiting value. In particular, where a more efficient use of available bandwidth becomes possible, more users (and, correspondingly, more content) may be supported. A significant advantage exhibited by the SRE/CODEC innovations disclosed and described herein are their capability to work with existing lossy video CODEC technology to achieve an increased total performance. In particular, the combination of SRE/CODEC, described herein, with known lossy CODECs is capable of maintaining content fidelity at levels of compression far in excess of what is possible using current lossy CODEC technology alone.

In comparison to previous attempts at integration of superresolution and video CODECs, the SRE/CODEC innovations disclosed and described herein do not employ back-propagation superresolution and are thus not subject to well-known deficiencies of the back-propagation formalism. These deficiencies include: (i) relatively high space/time algorithmic complexity impacting computability, and (ii) dependence upon spectral aliasing as the basis for super-Nyquist reconstruction. In the former deficiency, the SRE/CODEC innovations disclosed and described herein employ a direct matched-filter based reconstruction of edge-contours that does not require inversion of an image acquisition model nor any iterative refinement thereof. In this manner, algorithmic complexity is sharply reduced, enabling decreased latency and increased frame rate capability. In the latter deficiency, the decimation-based aliasing upon, which back-propagation superresolution depends, introduces degeneracy in mapping of super-Nyquist spectra that also serves to limit reconstruction accuracy. This problem can be addressed via superresolution processing on a resolution-tree, but only at the cost of a further increase of architectural and algorithmic complexity. A more subtle problem lies with distortion of aliased spectra used as back-projection tracking reference, where a lossy CODEC is applied to (aliased) downsampled content. In effect, a low-frequency noise source is introduced leading to a possibly catastrophic degradation of superresolution reconstruction performance. The fact that the SRE/CODEC superresolution described herein is scale-invariant by construction implies a complete absence of any dependence upon aliasing spectra and, thus, avoids these problems altogether.

The present inventions meet one or more of the above-referenced needs as described herein below in greater detail.

SUMMARY OF THE INVENTIONS

The present inventions relate generally to systems, processes, devices, and implementing technologies providing multichannel video network transport and improved compression and upscaler functionality.

A first aspect of the present inventions is directed to an improved method for transmission of a source video from a first location to a second location, wherein there is limited transmission bandwidth available between the first location and the second location, wherein the source video has a plurality of sequentially-ordered frames of images and has an original spatial sample rate, the source video is encoded to create a compressed video, the compressed video is received at the second location and then decoded and decompressed to create an output video, and the output video is then displayed to one or more recipients, the improved method comprises: encoding the source video to create the compressed video includes the steps of: (i) applying anti-alias, low-pass filtering to the source video; (ii) downsampling the low-pass filtered video to a reduced spatial sample rate lower than the original spatial sample rate, and then (iii) compressing the downsampled video using a lossy codec so that the compressed video has a further reduced spatial sample rate and is smaller in size than the source video; and, after transmitting the compressed video from the first location to the second location, decoding the compressed video includes the steps of: (i) decompressing the compressed video using the lossy codec, (ii) upsampling the decompressed video, and then (iii) applying photometric warp superresolution processing to each frame of the upsampled video to create the output video, wherein the output video has a resolution less than but approaching that of the source video.

In a feature, downsampling the low-pass filtered video to the reduced spatial sample rate defines a source downsampling ratio and the lossy codec compresses the downsampled video at a selected compression rate, wherein the compressed video has a total compression relative to the source video equal to the product of the source downsampling ratio and the selected compression rate.

In another feature, downsampling the low-pass filtered video causes high frequency spectral content from the source video to be discarded and wherein applying photometric warp superresolution processing to each frame of the upsampled video restores a portion of the high frequency spectral content to the output video.

In a further feature, the first location includes a transmitter and the second location includes a receiver.

A second aspect of the present inventions is directed to an improved system for transmission of a source video over a network having limited transmission bandwidth, wherein the source video has a plurality of sequentially-ordered frames of images and has an original spatial sample rate, wherein the source video is converted to a compressed video prior to transmission, and after transmission the compressed video is converted to an output video, and the output video is then displayed to one or more recipients, the improved system comprises: an encoder converts the source video into the compressed video by: (i) processing the source video through an anti-alias, low-pass filter, (ii) downsampling the low-pass filtered video to a reduced spatial sample rate lower than the original spatial sample rate, and then (iii) compressing the downsampled video using a lossy codec so that the compressed video has a further reduced spatial sample rate and is smaller in size than the source video; a transmitter receives the source video from the encoder and transmits the compressed video over the network to a receiver; a decoder receives the compressed video from the receiver generates the output video by: (i) decompressing the compressed video using the lossy codec, (ii) upsampling the decompressed video using an anti-image filter, and then (iii) applying photometric warp superresolution processing to each frame of the upsampled video to create the output video, wherein the output video has a resolution less than but approaching that of the source video.

In a feature, downsampling the low-pass filtered video to the reduced spatial sample rate defines a source downsampling ratio and wherein the lossy codec compresses the downsampled video at a selected compression rate, wherein the compressed video has a total compression relative to the source video equal to the product of the source downsampling ratio and the selected compression rate.

In another feature, downsampling the low-pass filtered video causes high frequency spectral content from the source video to be discarded and wherein applying photometric warp superresolution processing to each frame of the upsampled video restores a portion of the high frequency spectral content to the output video.

In a further feature, the transmitter is in electronic communication with the encoder and the receiver is in electronic communication with the decoder. In another feature, the transmitter is a separate and distinct electronic component from the encoder. In yet a further feature, the receiver is a separate and distinct electronic component from the decoder.

A third aspect of the present inventions is directed to an improved method for transmission of a source video over a network having limited transmission bandwidth, the source video having a plurality of sequentially-ordered frames of images in an uncompressed format and having an original spatial sample rate, the method comprises: for each of the sequentially-ordered frames of images of the source video, generating one or more edge contour reconstruction filter instances associated therewith, wherein each of the one or more edge contour reconstruction filter instances encodes high frequency spectral content of the associated frame, each encoded frame defining a stage one compression data file associated with a respective stage one image frame of the source video; downsampling the source video to remove high-frequency spectral content from each of the sequentially-ordered frames of images; compressing each of the sequentially-ordered frames of images of the downsampled source video using a lossy codec so that the compressed video has a reduced spatial sample rate lower than the original spatial sample rate and is smaller in size than the source video, each downsampled and compressed frame defining a stage two compression data file associated with a respective stage two image frame of the source video; interleaving the stage one compression data files with the stage two compression data files to define a compressed video packet associated with each stage one and stage two image frames, the compressed video packet having a smaller data file size than that of the corresponding, uncompressed image frame of the source video; transmitting one or more of the compressed video packets associated with the source video from a transmitter at a first location, over the network having limited transmission bandwidth, to a receiver at a second location; after receipt of one or more of the compressed video packets by the receiver, deinterleaving the compressed video packet to separate the stage one and stage two compression data files associated with each respective stage one and stage two image frame of the source video; decompressing each stage two compression data file using the lossy codec; upsampling the decompressed stage two compression data file to define a preliminary reconstructed frame associated with the corresponding frame of the source video, the preliminary reconstructed frame having a predetermined resolution less than the source resolution; extracting each of the one or more edge contour reconstruction filter instances from the stage one compression data file to obtain the high frequency spectral content associated with each respective frame of the source video; associating the extracted high frequency spectral content associated with each respective frame of the source video with its corresponding preliminary reconstructed frame; applying photometric warp superresolution processing to each preliminary reconstructed frame to restore the high frequency spectral content associated therewith and to generate an output video defined as a full-Nyquist reconstruction of each respective frame of the source video; and displaying the output video to a viewer at the second location.

In a feature, the step of generating one or more edge contour reconstruction filter instances associated with each of the sequentially-ordered frames of images comprises applying a nonlinear filter transformation to each of the sequentially-ordered frames of images, the output of which is a pattern manifold assembly (PMA) representation, wherein the PMA representation is an analytic image representation in which edge contours of the respective frame are emphasized. Preferably, the one or more edge contour reconstruction filter instances are extracted from corresponding PMA representations. Additionally, a gradient tracking loop provides an adaptive noise minimum threshold for selecting and discarding PMA representations.

In another feature, each edge contour reconstruction filter instance identifies a respective edge contour defined by its coordinate localization, curvilinear geometry, and orientation.

In a further feature, each stage one compression data file includes descriptor fields associated with each of the one or more edge contour reconstruction filter instances associated with the respective frame and identification of the respective edge contour associated with each corresponding edge contour reconstruction filter instance.

In yet another feature, each stage one compression data file includes x,y coordinates associated with each respective edge contour reconstruction filter instance associated with the respective frame along with variable values necessary for full-Nyquist reconstruction of the respective frame of the source video at the source resolution.

In further features, the step of interleaving the stage one compression data files with the stage two compression data files comprises embedding information from the stage one compression data files into one of: lossy-CODEC data fields of the stage two compression data files, extended or auxiliary IPv6 data fields of the compressed video packets, and separate data packets and IP addresses linked with the corresponding stage two compression data files.

In some embodiments, the source video is a pre-recorded video or a live streaming video.

In other embodiments, the source video (i) originates from one of a plurality of first locations and is transmitted to a single second location, (ii) originates from a single first location and is transmitted to one or more second locations, or (iii) is a shared conference video originating from and transmitted between a plurality of first and second locations.

The aspects of the invention also encompass a computer-readable medium having computer-executable instructions for performing methods of the present invention, and computer networks and other systems that implement the methods of the present invention.

The above features as well as additional features and aspects of the present invention are disclosed herein and will become apparent from the following description of preferred embodiments.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein:

FIGS. 1(a)-1(e) illustrate several exemplary high-level system architectural templates incorporating the SRE/CODEC functionality disclosed and described herein.

FIG. 2 illustrates a "Blind" SRE/CODEC model for use with the systems of FIGS. 1(a)-1(e).

FIG. 3(a) illustrates a "Source-Encoded" SRE/CODEC (time-domain) model, in which Pattern Manifold Assembly (PMA) and Edge-Contours Reconstruction Filter (ECRF) instancing are performed at the transmitter, for use with the systems of FIGS. 1(a)-1(e).

FIG. 3(b) illustrates a "Source-Encoded" SRE/CODEC (frequency-domain) model, in which sufficient vector processing resources are available, for use with the systems of FIGS. 1(a)-1(e).

FIG. 4(a) illustrates an Extended Networking Protocol for use with the "Source-Encoded" SRE/CODEC (time-domain) model of FIG. 3(a).

FIG. 4(b) illustrates an Extended Networking Protocol for use with the "Source-Encoded" SRE/CODEC (frequency-domain) model of FIG. 3(b).

FIG. 5 illustrates an exemplary SRE/CODEC Warp-Domain Local "Patch" instance generated by the SRE/CODEC functionality disclosed and described herein.

FIG. 6 illustrates an Adaptive Edge-Contour Noise Thresholding Loop for use with the SRE/CODEC functionality disclosed and described herein.

FIG. 7 illustrates an exemplary Source Frame (RGB/1080p) content for use with the SRE/CODEC functionality disclosed and described herein.

FIG. 8 illustrates a "1/4-rate" Resampled Source (Insert) of the exemplary source frame of FIG. 7.

FIG. 9 illustrates a "1/16-rate" Resampled Source (Insert) of the exemplary source frame of FIG. 7.

FIG. 10 illustrates a Warp Loci Visualization ("NRSF=4") of the exemplary source frame of FIG. 7.

FIG. 11 illustrates an SRE/CODEC Output ("NRSF=4") of the exemplary source frame of FIG. 7, in which the "1/16-rate" SRE/CODEC reconstructed/superresolved exemplary source-content is displayed.

FIG. 12 is an SRE/CODEC Performance Summary, in which SRE/CODEC benchmark testing on exemplary source-content is summarized in tabular form.

DETAILED DESCRIPTION OF PREFERRED EMBODIMENTS

Before the present technologies, systems, devices, apparatuses, and methods are disclosed and described in greater detail hereinafter, it is to be understood that the present technologies, systems, devices, apparatuses, and methods are not limited to particular arrangements, specific components, or particular implementations. It is also to be understood that the terminology used herein is for the purpose of describing particular aspects and embodiments only and is not intended to be limiting.

As used in the specification and the appended claims, the singular forms "a," "an," and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutations of these cannot be explicitly disclosed, each is specifically contemplated and described herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices.

Embodiments of the methods and systems are described below with reference to block diagrams and flowchart illustrations of methods, systems, apparatuses and computer program products. It will be understood that each block of the block diagrams and flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

A. HIGH LEVEL SUMMARY

Video CODECs, such as Motion JPEG (MJPEG), H.264, and MPEG-4, have found widespread acceptance as video compression solution in today's marketplace. In principle, compression ratios at three orders of magnitude are possible with these technologies. However, in many applications of interest, the fact these CODECs employ lossy block-based differential encoding limits useful compression to a more moderate 20:1-40:1 range. From an information theoretic perspective, this reduction may be regarded as manifestation of the fact, at the scale of a given blocksize, only so much redundancy of a given type is present in any image sequence. One consequence of this is that an overly aggressive redundancy-based encoding is prone to create excessive artifacts and unacceptably high noise levels in an output image.

While block-based differential video compression has proven very successful, the inherent performance limitations of this approach also serve to hinder evolution of video system applications for which an increased level of compression performance is critical or desirable. In the SRE/CODEC innovation disclosed and described herein, a complementary approach in which superresolution is applied to an extension of useful compression ratios for these techniques is taken. This is possible by virtue of the fact that superresolution upscaling is by definition super-Nyquist. That is to say, superresolution reconstruction filtering synthesizes spectral content according to an assumed structural model. An important point is that the structural model is not included with transmission payload and may thus be leveraged as the basis for an optimal encoding of synthesized spectra. An increased compression then hinges upon the fact optimal encoding of all or part of an image implies a reduced bandwidth requirement. That is to say, any excess bandwidth associated with transmission of the non-encoded version may in principle be discarded. This is in fact the conceptual basis of superresolution-based compression.

In one implementation, video transmission payload is cast in terms of a logical sum of objects plus edge-contours bordering objects. Edge-contours are then optimally encoded in terms of superresolution reconstruction filters instanced at specific coordinates. Associated spectra are then discarded pre-transmission to an extent consistent with reconstruction at some imposed accuracy criterion. Where the specific case of edge-contour encoding is considered, spectra are generally isolated to highest spatial frequencies that may be removed via a tailored downsampling process.

This downsampled source is itself available for encoding via an ancillary CODEC. With application of such encoding, total compression is then given by a product of edge-contour reconstruction compression and lossy CODEC compression in what amounts to a two-stage succession of CODEC transformations. As described hereinafter, this novel concept forms the basis of a Superresolution-Enabled video CODEC (SRE/CODEC) that optionally leverages some lossy CODEC, such as H.264/MPEG-4/MJPEG, as a second layer. This construct is then shown capable of '×4', '×16' increased compression ratios relative to the lossy CODEC alone.

Exemplary SRE/CODEC system applications include but are not limited to: (i) Video Surveillance, (ii) Streaming Video, (iii) Video Conferencing, and (iv) Video Telephony. FIGS. 1(a)-(d) illustrate at a high level several of these exemplary system architectural templates incorporating SRE/CODEC functionality. Each architectural template is tailored to a specific business or use application for which enhanced SRE/CODEC compression enables an increased network capacity.

Specifically, FIG. 1(a) provides a generic Internet-of-Things (IoT)-based Video Surveillance System (VSS) 100a incorporating Internet video transport over a network 150 from multiple satellite camera-feed aggregation point Video Servers 110 to a centralized monitoring location or facility 160 that implements the SRE/CODEC processes and technology described herein. In this system 100a, superresolution ENCODE/DECODE block-components 120, 170, respectively, are distributed to remote edge-compute Video Servers 110 and to the centralized monitoring facility 160. The remote edge-compute Video Servers 110 aggregate video from a plurality of distinct camera-feeds 130, the videos are encoded, transmitted over the network 150 to the centralized monitoring facility 160, decoded, and then viewed, analyzed, and/or stored in data storage 190.

FIG. 1(b) illustrates an Internet-based Streaming Video system 100b incorporating SRE/CODEC processes and technology described herein. In this system 100b, ECRF ENCODE/DECODE, Upsample/Downsample (US/DS), and Superresolution (SRES) block-components 120, 170, respectively, are distributed to content provider video servers 111 and a plurality of set-top-boxes 161 located at remote user locations. Streaming video content may be derived from live-video sources 131 or NFS archive repository sources 141. The videos are encoded, transmitted over the network 150 to the plurality of set-top-boxes 161, decoded, and then viewable on the set-top-boxes 161.

FIG. 1(c) illustrates an Over-the-Air (OTA) Streaming Video 100c incorporating SRE/CODEC processes and technology described herein. In this system 100c, ECRF ENCODE/DECODE, Upsample/Downsample (US/DS), and Superresolution (SRES) block-components 120, 170, respectively, are distributed to content provider video servers 112 and a plurality of televisions 162 located at remote user locations. Streaming video content may be derived from live-video sources 132 or NFS archive repository sources 142. The videos are encoded, transmitted over the air using conventional broadcast networks 155 to the plurality of televisions 162, decoded, and then viewed by end users on the televisions 162.

FIG. 1(d) illustrates a generic Video Conferencing System (VCS) 100d incorporating SRE/CODEC processes and technology described herein. VCS data transport is inherently bidirectional requiring access to ECRF ENCODE/DECODE, Upsample/Downsample (US/DS), and Superresolution (SRES) block-components 120, 170, respectively, for all users 163. In this specific embodiment, VCS is also distributed with incorporation of remote internet network connections. Thus, for considerations of increased efficiency and reduced cost, SRE/CODEC services are preferably localized, as shown, at application servers 113 aggregating VCS web-traffic distributed bidirectionally over the network 150.

FIG. 1(e) illustrates a generic Video Telephony System (VTS) 100e incorporating SRE/CODEC processes and technology described herein. Similar to VCS data transport, VTS data transport is inherently bidirectional over a cellular or data network 158. Thus, each user mobile device/videophone 165 preferably includes access to full SRE/CODEC functionality, including ECRF ENCODE/DECODE, Upsample/Downsample (US/DS), and Superresolution (SRES) block-components 120, 170, respectively, for each user mobile device/videophone 165.

In such system applications, bandwidth constraints become active with presence of an arbitrarily large number of individual feed or channels located at network aggregation points. In this context, SRE/CODEC compression provides an obvious performance benefit based upon bandwidth reduction at each video feed.

In a further enhancement, total realizable compression is increased as a result of edge-contour lossless encoding at full (source) resolution, whereby photometric warp edge-dislocation noise and edge-contour extrapolation noise sources are effectively eliminated. Further, the fact that this encoding is performed at source resolution, (i.e. pre-downsampling), enables super-Nyquist reconstruction in combination with an increased total compression.

High level aspects of various embodiments of the technology disclosed and described herein include but are not limited to:

(1) Generic SRE/CODEC architecture, (i.e. any edge-contour reconstruction filter/PMA function in layer-1, any CODEC in layer-2)
(2) 'Blind' SRE/CODEC Model (FIG. 2)
(3) Source-Encoded SRE/CODEC Model (t-domain) (FIG. 3(a))
(4) Source-Encoded SRE/CODEC Model (f-domain) (FIG. 3(b))
(5) Lossless encoding of Edge-Contour Reconstruction Filters (ECRF)
(6) Pattern Manifold Noise Floor (PMNF) Gradient Adaptation Detail (FIG. 6)
(7) 2D-Raised Cosine Filter for downsample spectral shaping
(8) IoT/VSS SRE/CODEC architectural implementation (FIG. 1(a))
(9) IoT/VSS SRE/CODEC Offline Archival Storage (FIG. 1(a))
(10) Streaming Video SRE/CODEC system architectural implementation (FIG. 1(b))
(11) OTA Broadcast SRE/CODEC system architectural implementation (FIG. 1(c))
(12) Video Conferencing SRE/CODEC system architectural implementation (FIG. 1(d))
(13) Video Telephony SRE/CODEC system architectural implementation (FIG. 1(e))

B. SUPERRESOLUTION ENCODING MODEL

SRE/CODEC ENCODE accepts as input the Pattern Manifold Assembly (PMA) structural representation whereby p-Warp processing is restricted to interpolants occurring within a '$(2n_{RSF}+1) \times (2n_{RSF}+1)$' image patch ('$n_{RSF}$' ≡ 'Resample Scale (zoom) Factor') centered on image pixel '$p_{ij}$' where:

$$P^{ij} = \begin{pmatrix} p_{i+n_{RSF}, j-n_{RSF}} & \cdot & \cdot & \cdot & \cdot \\ p_{i+n_{RSF}-1, j-n_{RSF}} & \cdot & \cdot & \cdot & \cdot \\ \cdot & \cdot & p_{i,j} & \cdot & \cdot \\ \cdot & \cdot & \cdot & \cdot & \cdot \\ \cdot & \cdot & \cdot & \cdot & p_{i-n_{RSF}, j+n_{RSF}} \end{pmatrix} \quad (1)$$

In an alternative reconstruction filter formulation, pixel estimator updates are applied as a magnitude-only adjustment to an existing color-space vector value:

$$\hat{p}_{kl} = \lambda \frac{\bar{p}_{kl}}{\|\bar{p}_{kl}\|_2} = \Lambda(\{p_{ij}\}_{ij}, \bar{p}_{kl}) \bar{p}_{kl} \quad (2a)$$

$$\lambda \equiv \Lambda(\{p_{ij}\}_{ij}, \bar{p}_{kl}) = \left\| \frac{\sum_{i=1}^{n}\sum_{j=1}^{m} w_{ij} p_{ij}}{\sum_{i=1}^{n}\sum_{j=1}^{m} w_{ij}} \right\|_2 \quad (2b)$$

$$w_{ij} = idx_{ij} e^{-\alpha(p_{ij}-\bar{p}_{kl})^2} = idx_{ij}(p_{ij}, \bar{p}_{kl}; \alpha) \quad (2c)$$

Alternative formulations share a common slope-increasing property in the vicinity of an edge-contour. Per Equation (2c) above, RHS is equivalent to instancing of a reconstruction filter based upon application of an edge-contour classification process to an intermediate Pattern Manifold Assembly (PMA) representation '$M_P$' given by:

$$L_{kl}^{ij} = e^{-\delta|\nabla^2 P_{kl}^{ij}|} \quad (3a)$$

$$_T M^{ij} = \frac{\nabla P^{ij}}{\|\nabla P\|_\infty} *_T L^{ij} \quad (3b)$$

$$M_P^{ij} = \sqrt{_T M^{ij} * (_T M^{ij})^*} \quad (3c)$$

$$idx_{ij} = \max_{k \in \{1, n_{FO}\}} \{F_k \otimes M_P^{ij}\} \quad (4)$$

Equations (3a), (3b), and (3c) define the PMA representation in terms of gradient and Laplacian operators applied to a given local patch. PMA response is tailored for preemphasis of any edge-contour geometry that may be present in an image. Equation (4) then defines instancing of an edge-contour reconstruction filter specific to local edge-contour geometry in terms of a maximal matched filter response among all elements of reconstruction filter bank '$\{F_k\}$'. Other PMA functions are possible but will share a common edge-contour preemphasis characteristic.

As will be explained in greater detail in the following two sections, a PMA representation may be generated for both 'blind' SRE/CODEC models (Section C below) and 'source-encoded' SRE/CODEC models (Section D below). In 'blind' SRE/CODEC, PMA is performed on downsampled content. In 'source-encoded' SRE/CODEC, PMA is performed on source content at original resolution.

C. "BLIND" SRE/CODEC MODEL

In the 'Blind' SRE/CODEC Model, all superresolution processing is performed at the receiver and is preferably employed under circumstances where a simplest possible implementation of SRE/CODEC bandwidth reduction is desired and reduced reconstruction performance may be tolerated. Accordingly, the PMA structural representation is generated at the receiver on upsampled content at reduced resolution.

As shown in FIG. 2, with a 'Blind' SRE/CODEC model 200, the video input 205 is provided to the transmitter 210, which includes the ENCODE component, which is restricted to downsampling (layer-1: no superresolution reconstruction encoding) followed by lossy compression (layer-2). After transmission 250 to the receiver 290, all superresolution reconstruction is then performed at the receiver 290, which outputs the video output 295. Total compression is the product of stage-2 lossy compression and downsample/resample scale factor ("$N_{RSF}$") squared. As an example, with an assumed resample scale factor "$N_{RSF}=2$" applied along each image axis, stage-1 compression is "2×2=4". If stage-2 compression is further assumed at "30×", total SRE/CODEC compression is given by the product "4×30=120".

The singular advantage of this approach is a simplicity borne of the fact that no explicit PMA encoding is required by the transmitter 210. Thus, no reconstruction filter instance transmission overhead is incurred and all superresolution processing accrues exclusively at the receiver 290. However, this model 200 is also subject to edge-dislocation noise and edge-extrapolation error that degrades reconstruction accuracy and, therefore, realizable CODEC QoR. In order to address these challenges, the Source-Encoded SR/CODEC Models displayed in FIGS. 3(a) and 3(b) are preferably used.

D. "SOURCE-ENCODED" SRE/CODEC MODEL

FIG. 3(a) illustrates a 'Source-Encoded' SRE/CODEC (time-domain) model 300a and FIG. 3(b) illustrates a 'Source-Encoded' SRE/CODEC (frequency-domain) model 300b (which will be described in greater detail below), in which Pattern Manifold Assembly (PMA) 315 and Edge-Contours Reconstruction Filter (ECRF) 325 instancing are performed at the transmitter 310. ENCODE components include descriptor fields for each generated ECRF instance along with the edge-contours identified during PMA 315. The PMA 315 interacts with a PMNF 320—this interaction, a PMNF Gradient Adaptation process 600, in which a gradient adaptation loop mechanism is used for setting a pattern manifold noise threshold, will be described in greater detail in association with FIG. 6 below. This ECRF ENCODE data 330, combined with stage-2 lossy compressor output 335a or 335b, respectively, forms a total transmission payload 345 that is transmitted 350 to the receiver 390. DECODE at the receiver 390 extracts this payload information 345 as the basis for an improved fidelity reconstruction at full source resolution. In the embodiment shown in FIG. 3(a), image downsampling is performed in time-domain via an initial (FIR/Anti-Aliasing) Low-Pass Filter (LPF) 340 followed by downsampling 342. Similarly, upsampling 362 at the receiver 390 is followed by an anti-alias filter 365 for removal of higher order spectral images. Total compression is the product of stage-2 lossy compression and reduced downsample/resample scale factor ('$N_{RSF}$') squared.

In the source-encoded model 300a, any edge-dislocation error that may be induced by downsampling 342 is eliminated with application of Equations (3) and (4) to full-resolution source content 305 already available at the transmitter 310. Thus, reconstruction filtering is applied to edge-contours at full source resolution whereby result edge-extrapolation error is eliminated relative to the 'blind' counterpart (as shown in FIG. 2). This result is obtained based upon exact replication of local geometry as expressed at source resolution. Total transmission payload 345 then consists of encoded Edge-Contour Reconstruction Filter instances (ECRF) plus stage-2 encoding of the down-sampled source content. In this manner, RCF transmission overhead is exchanged for an enhanced compression performance resulting from what is essentially error-free RCF localization at the receiver 390.

Per Equation (4), ECRF instances are completely specified by edge-contour classification in terms of coordinate localization, curvilinear geometry, and orientation. In upscaler applications, this information is generated based upon: (i) PMA localization and orientation of an edge-contour at a given set of coordinates and (ii) PRE matching of local edge-contour geometry to one element of an assumed ECRF archetype set. Here, it is noted that, where the "blind" SRE/CODEC variant 200 is considered, instancing on this set is logically equivalent to an extrapolation of edge-contour geometry within the local patch given in Equation (1). However, Source-Encoded SRE/CODEC 300a affords a different treatment in that no geometric extrapolation is required based upon explicit evaluation of Equation (4) LHS, in which edge-contour, warp support, and warp points are enumerated at full resolution. In this manner, full specification of photometric warp within a warp domain is given by PMA with no requirement for PRE.

An example is displayed in FIG. 5 where an essentially free-form edge contour is displayed with accompanying warp and warp-support points on an '$N_{RSF}$=4' local patch. Specifically, FIG. 5 illustrates an Exemplary SRE/CODEC Warp-Domain local-patch instance 500 in which all pWarp superresolution processing is performed on local patches centered upon a Reconstruction Filter (RCF) instance at x-y coordinate 'ij' ($RCF_{ij}$) 501. Each such RCF instance corresponds to an Edge-Contour (EC) detection event generated within context of Pattern Manifold Assembly (PMA) processing. Taken together, the set of all RCF instances defines EC reconstruction over an entire image or frame.

Local patch size and geometry define a warp-domain post upsampling to target resolution, dimensions and geometry of which are determined according to a required reconstruction performance at an assumed Resample Scale Factor ($N_{RSF}$). In FIG. 5, a square ($2N_{RSF}+1 \times 2N_{RSF}+1$) patch geometry 502 is assumed but other possibilities are available.

Warp-Support (WS) points 503 appear as domain variables to warp-operator 'A' (from Equation (2)), and generally correspond to a sampling of pixels from the source downsampled image adjacent to pixel $RCF_{ij}$ in upsampled image coordinates. Edge-Contour (EC) pixels 504 appear as adjacent EC detection events appearing within a warp-domain. As defined, EC pixels exhibit graph structure characteristic of a curvilinear geometry but do not appear as the current locus of RCF instance processing. It should be noted that in source-encoded SRE/CODEC, EC-pixels are localized exactly based upon application of Pattern Manifold Assembly (PMA) at source resolution. This obviates any curvilinear approximation error or edge-dislocation (ERR) 505, as may otherwise accrue where blind SRE/CODEC is employed. Pixels that are not WS, EC, $RCF_{ij}$, or otherwise appearing on a warp-domain boundary 506 then remain as candidates for warp-processing, per Equation (2). As displayed in FIG. 5, the set of warped pixels (W) 507 is selected so as to enable perfect EC reconstruction according to a scale-invariant structural model. Accordingly, warped pixels 507 will appear adjacent to the curvilinear geometry exhibited by the set of Edge-Contour (EC) pixels and in an approximately perpendicular direction. Where a significant probability of EC 'dropout' detection error is present, (e.g. on adjacent $RCF_{ij}$ instances), a programmable overlap on warped-pixel sets generated at adjacent $EC/RCF_{ij}$ instances may be optionally employed as a noise mitigation measure.

Superresolution processing on local warp-domains is distributed according to the specific SRE/CODEC architecture being employed. As displayed in FIG. 2, with 'blind' SRE/CODEC all superresolution processing is isolated to the receiver (RX) 290, whereas in FIGS. 3(a) and 3(b), 'source-encoded' SRE/CODEC superresolution processing is distributed between transmit (TX/ENCODE) and receive (RX/DECODE) components 310, 390 respectively. In particular, 'source-encoded' SRE/CODEC 300a performs Pattern Manifold Assembly (PMA) 315, Pattern Manifold Noise Floor (PMNF) 320 thresholding, Edge-Contour Reconstruction Filter instancing and encode (ECRF Encode) 325, source-video downsampling 342, and transport data-interleave 333 as TX/ENCODE operations, while remaining transport data-deinterleave 353, ECRF decode 351, video upsampling 362, and warp-reconstruction (WARP) process components 370 are performed as RX/DECODE operations.

Each source-Encoded SRE/CODEC architectural form displayed in FIG. 3(a) and FIG. 3(b) generates an interleaved datastream 345 at the TX/ENCODE network interface. This datastream consists of two components: (i) stage-2 downsampled video content 335a, 335b, respectively, and (ii) Reconstruction Filter (RCF) instances encoded as an information side-channel 330, content of which is sufficient to specification of superresolution reconstruction processing to be performed at the receiver 390. The minimal side-channel content 330 consists of: (i) image coordinates at which reconstruction processing is to be performed and (ii) reconstruction filter orientation along a specified set of cardinal directions. Local edge-contour curvilinear structure is then implicit to a set of neighboring edge-detections appearing within the local patch centered at the current processing locus. In this manner, an arbitrary curvilinear edge-contour geometry may be accommodated. A minimal ECRF encoding preferably includes: (i) edge-detection event position and (ii) corresponding edge-orientation, (e.g. gradient angle). Local edge-contour geometry is implicit to occurrence of adjacent edge-detection events within a local patch.

There are a number of means by which the indicated side-channel assembly and data-interleave operations may be accomplished. However, in a preferred implementation: (i) reconstruction loci are encoded based upon isomorphic mapping of image x-y coordinates to a network datagram number modulo assumed frame dimensions, (ii) instances of the p-Warp filter formulation described in Equation (2a), (2B), and (2c) are encoded based upon calculation of edge-contour (EC) orientation at those coordinates, and (iii) data interleave and deinterleave are performed based upon use of extended or auxiliary IPv6 packet data-fields. RCF instance orientation is further resolved along predefined cardinal directions with the result that the RCF instance encode data field is reduced to specific number of bits required for representation of a given number of possible RCF orientations.

E. SYSTEM BANDWIDTH REDUCTION MODEL

In most general terms, SRE/CODEC compression hinges upon a two-step process in which source video is blurred pre-transmission and then reconstructed post-transmission. This can be viewed as a spectral transformation in which maximum spatial frequency content '$f_{Spatial}^{Max}$' is first reduced and then increased/restored according to the Nyquist-Shannon sampling theorem. Within this context, the sampling theorem specifies a minimum video sampling rate '$f_S = 2 f_{Spatial}^{Max}$'. At this sample rate, a given video source is bandwidth-reduced according to an assumed '$N_{RSF}$':

$$f_S^{DS} = \frac{f_S}{N_{RSF_{ROW}} N_{RSF_{COL}}} = \frac{2 f_{Spatial}^{Max}}{N_{RSF}^2} \quad (5)$$

The IoT VSS example displayed in FIG. 1(a) is employed as an exemplary basis for development of an SRE/CODEC performance model in terms of a "Bandwidth Reduction Ratio" (BRR) defined below. In development of this performance model, it is noteworthy that image content may consist of multiple colors, while RCF encoding is performed at a pixel location independent of color content. Thus, with assumption of '$N_{COLOR}$' color-space axes and '$N_{BIT}$' RCF encoding, the following analysis is performed:

$$f_S^{AS} = f_S \sum_{i=1}^{N_{VS}} N_{CF_i} = 2 f_{Spatial}^{Max} \sum_{i=1}^{N_{VS}} N_{CF_i} \quad (6)$$

-continued $$f_S^{DS/VS_i} = \frac{2 f_{Spatial}^{Max} \left(1 + \frac{\rho_i N_{BIT} N_{RSF}^2}{8 N_{COLOR}}\right) N_{CF_i}}{N_{RSF}^2} \quad (7)$$

$$f_S^{DS/AS} = \frac{2 f_{Spatial}^{Max} \sum_{i=1}^{N_{VS}} \left(1 + \frac{\rho_i N_{BIT} N_{RSF}^2}{8 N_{COLOR}}\right) N_{CF_i}}{N_{RSF}^2} \quad (8)$$

$$BRR = \frac{f_S^{AS}}{f_S^{DS/AS}} = \frac{N_{RSF}^2 \sum_{i=1}^{N_{VS}} N_{CF_i}}{\sum_{i=1}^{N_{VS}} \left(1 + \frac{\rho_i N_{BIT} N_{RSF}^2}{8 N_{COLOR}}\right) N_{CF_i}} \quad (9)$$

Where:
- '$N_{VS}$'=Number of video servers
- '$N_{CF_i}$'=Number of camera feeds at the 'ith' video server
- '$f_S^{AS}$'=Aggregate 'non-downsampled' sampling rate at application server
- '$f_S^{DS/VS_i}$'='Downsampled' sampling rate at 'ith' video server fDS/AS
- '$f_S^{DS/AS}$'=Aggregate downsampled sampling rate at application server

F. VIDEO RESAMPLING

It is noteworthy that Equation (5) remains valid only under those circumstances where '$N_{RSF}$' is precisely matched with a specified spectral support. In FIG. 3(a), this is guaranteed by successive time-domain anti-aliasing LPF 340 and resampling operations. An equivalent frequency-domain approach 300b, as shown in FIG. 3(b), may also be employed in which time-domain anti-aliasing LPF and resampling are replaced with an explicitly defined spectral transfer characteristic in combination with spectral pruning. It should be noted that the time-domain or frequency-domain version may prove more suited on a case-by-case basis, based upon an assumed implementation model and available processing resources. It should also be noted that '2D-RCF' exhibits some advantages in terms of ease of use, but represents only one means for achieving a desired anti-alias/anti-Gibbs filter response.

FIG. 3(b) illustrates a 'Source-Encoded' SRE/CODEC (frequency-domain) 300b, that may be employed where available when vector processing resources are sufficient to a given frames-per-second (FPS) processing requirement. SRE/CODEC downsampling and upsampling may also be performed in the frequency domain via application of an FFT or DCT operational transform 341, 343 and 361, 363, respectively for downscaling and upscaling, to successive frames at full input resolution. In such case, a '2D' Raised-Cosine Filter (RCF) 332 is applied to frame spectra pre-stage-2 lossy compression for anti-alias and anti-Gibbs phenomenon spectral shaping. This ECRF ENCODE data 330, combined with stage-2 lossy compressor output 335b, forms a total transmission payload 345b. In all other respects, frequency-domain SRE/CODEC 300b of FIG. 3(b) is functionally equivalent to the time-domain version 300a of FIG. 3(b). In particular, ECRF/ENCODE 325 and its output 330 are identical in both models 300a and 300b. In each case, total compression is the product of stage-1 and stage-2 compression ratios per the bandwidth reduction model described above.

As shown in FIG. 3(b), the '2D' Raised-Cosine Filter (RCF) 332 is applied directly to operationally transformed (FFT) video content (video source 305 as transformed by FFT or DCT operational transform 341, 343 (on downscaling side) and 361, 363 (on upscaling side)) and employs a transfer characteristic:

$$H_{2D-RCF}(r_f) = \begin{cases} 1, & |r_f| \le \frac{1-\beta}{2T} \\ \frac{1}{2}\left[1 + \cos\left(\frac{\pi T}{\beta}\left[|r_f| - \frac{1-\beta}{2T}\right]\right)\right] \\ 0, & |r_f| > \frac{1+\beta}{2T} \end{cases} \quad \left| r_f = \sqrt{x_i^2 + y_j^2} \right. \tag{10}$$

Where '$r_f$' is a radial spatial frequency, (here expressed as a function of row/column bin coordinates), '$\beta$' is the so-called spectral roll-off parameter and 'T' is reciprocal of the symbol rate. The 2D-Raised Cosine Downsampling Filter 332 generating function is displayed for the spectral shaping filter employed for the source-encoded SRE/CODEC (f-domain) variant. The fact that this filter transfer characteristic is symmetric about zero-frequency in both dimensions (i.e. about 'zero/DC' coordinate) admits representation in terms of a 'radial' frequency, ('$r_f$'). The purpose of this filter is two-fold: (i) anti-aliasing and (ii) anti-Gibbs phenomenon. Alternative filter formulations may be employed for this purpose but the singular advantage of this particular filter formulation is '$f_{Corner}$', '$f_{Stop}$', and transition characteristic are quantitatively specified solely in terms of symbol rate 'T' and spectral rolloff parameter '$\beta$'.

G. NETWORKING CONSIDERATIONS

As displayed in FIGS. 4(a) and 4(b), where source-encoded SRE/CODEC is considered, container data interleave and packet assembly operations may also be incorporated as layered extensions (on the TX/ENCODE side 425a, 425b and on the RX/DECODE side 475a, 475b) to existing TCP, RTP, and UDP networking protocols. These extensions remain applicable to both time-domain and frequency domain architectural forms 300a and 300b from FIGS. 3(a) and 3(b), respectively, and accrue at two levels: (i) TX/ENCODE and RX/DECODE functionality is layered above TCP/RTP/UDP and (ii) any instance of TCP, RTP, UDP protocol may itself be extended so as to perform the required data interleave and deinterleave operations.

H. EDGE-CONTOUR NOISE-FLOOR TRACKING AND NOISE-THRESHOLD ESTIMATION

Nominal video content can be expected to include some admixture of noise processes that will impact fidelity of Edge-Contour (EC) detection and thus Reconstruction Filter (RCF) instancing. It then follows, for highest possible reconstruction performance, EC detection is performed subject to Signal-to-Noise (S/N) estimation.

As displayed in FIG. 6, an adaptive gradient tracking loop 600 is employed for calculation and application of a threshold on EC detection events whereby events falling below the threshold are considered noiselike and the remainder are considered as valid EC detection events. Use of an adaptive mechanism provides two significant benefits: (i) fully automated, 'self-tuning' operation, and (ii) real-time calculation of threshold values based upon actual noise present in an image.

EC noise-floor tracking is then performed as an operational sequence:

(a) EC detection events 610 are generated and output within context of Pattern Manifold Assembly (PMA) processing 620 over a given frame or image. A comparator 625 applies a detection threshold to each such event whereby valid EC detection events 630 are passed as output for RCF instancing, while noiselike events are blocked.

(b) Internal to noise-floor estimation, total PMA response is passed to the Noise Estimation block (NZE) 640. As described below, NZE generates noise-threshold estimates 645 on PMA response that optimize probability of detection ('$P_{DET}$') as an objective on probability of noise event ('PNE') and probability of edge-contour ('$P_{EC}$') event detection estimators.

(c) Noise-Threshold estimates 645 thus generated are differenced frame-to-frame so as to form a gradient increment to the current NF estimate. This increment is normalized and then accumulated so as to form an EC-detection threshold 670. In operation, negative increments reduce the threshold value allowing EC detection-events to pass at lower PMA response amplitude, while positive increments increase the threshold thus restricting EC-detection events to increased PMA response amplitude.

Still referring to FIG. 6, adaptively generated noise thresholds are applied to the PMA amplitude response per Equation (3c). Noise-Threshold estimates are updated according to gradient-tracking of the amplitude at which a minimum correlation with adjacent edge-contour detection events is observed.

Specifically, a Pattern Manifold Noise Floor (PMNF) estimate 645 is generated by the Noise Estimator (NZE) block 640 and updated at each successive frame. Updates are processed in a gradient tracking loop so as to follow temporal noise floor fluctuations in setting of a detection threshold on Edge-Contour (EC) detection events generated at the Pattern Manifold Assembly (PMA) block 620 output. Each update is differenced with the previous estimate in calculation of a gradient step then accumulated as a noise amplitude threshold 670 applied to EC detection events 610. Detection event amplitudes falling below the threshold are rejected as noiselike response, and those above are passed as valid input to Edge-Contour Reconstruction Filter (ECRF) instancing and encoding by the ECRF Encode block displayed in FIGS. 3(a)(b) and 4(a)(b).

Per assumed EC geometry, EC detection events are expected to be mutually correlated in terms of amplitude and gradient direction along a curvilinear contour occurring within a given local patch. Accordingly, in generation of PMNF estimates, the NZE block accepts PMA detections as input and tests correlation of each detection event with those adjacent. NZE further tabulates mean cross-correlation as a monotonic function of pixel amplitude:

$$\mu_{CORR} = R(A_{PX}) \tag{11}$$

Under circumstances where uncorrelated AWGN noise processes predominate, '$\mu_{CORR}$' may be assumed an isomorphism and therefore invertible. Thus, at a minimum correlation for any EC detection event, the PMNF estimate is given by:

$$PMNF_{Est} = A_{PX_{Threshold}} = R_{Corr}^{-1}(\mu_{Corr_{Min}}) \tag{12}$$

Per FIG. 3, detection threshold values are then updated as a time-series of gradient increments:

$$T_{NZ}^{k+1} = T_{NZ}^{k} + \alpha \nabla(PMNF_{Est}) \tag{13}$$

In this manner, temporal fluctuations in noise floor amplitude are tracked as the amplitude at which minimum EC detection cross-correlation shifts.

I. EXAMPLE SOURCE FRAME CONTENT

In FIG. 7, an exemplary Source Frame (RGB/1080p) content 1000 is displayed.

In FIG. 8, a '1/4-rate' Resampled Source (Insert) 850 of the exemplary source frame 700 of FIG. 7 is illustrated. The exemplary source content frame downsampled to quarter-rate ('$N_{RSF}$=2') is displayed as an insert 850 in the upper left corner of the original frame 700. In SRE/CODEC operation, downsampled content is passed to ENCODE layer-2 for lossy encoding.

In FIG. 9, a '1/16-rate' Resampled Source (Insert) 950 of the exemplary source frame 700 of FIG. 7 is illustrated. The exemplary source content frame downsampled to quarter-rate ('$N_{RSF}$=4') is displayed as an insert 950 in the upper left corner of the original frame 700. In SRE/CODEC operation, downsampled content is passed to ENCODE layer-2 for lossy encoding.

FIG. 10 illustrates a Warp Loci Visualization ('$N_{RSF}$=4') 1050 of the exemplary source frame 700 of FIG. 7. The full set of superresolution warp-domains generated on the exemplary source content frame 700 is displayed. Each warp-domain has dimensions of a local patch and is centered on a non-noiselike Pattern Manifold Assembly response pixel. Overlapping warp-domains are correlated along an edge-contour within context of photometric warp (superresolution) processing.

FIG. 11 illustrates an SRE/CODEC Output ('$N_{RSF}$=4') 1150, in which the '1/16-rate' SRE/CODEC reconstructed/superresolved exemplary source-content is displayed.

FIG. 12 is an SRE/CODEC Performance Summary 1250, in which SRE/CODEC benchmark testing on exemplary source-content is summarized in tabular form. The original unmodified source-content at full resolution is assumed as reference in calculation of 'PSNR' and '$\Delta_{PSNR}$' values. The '$\Delta_{PSNR}$' calculation is further referenced to an upsampled (non-superresolved) version of the downsampled content generated at layer-1 SRE/CODEC ENCODE. The indicated Bandwidth Reduction Ratio ('BRR') is then calculated based upon comparison of the total number bytes generated by downsampled content plus total number of bytes required for ECRF/ENCODE to the total number of bytes required for transmission of the original unmodified source-content.

J. INCORPORATIONS BY REFERENCE

This application references, and incorporates herein in their entirety, each of the following U.S. patents:

{1} P. Topiwala, "Real-Time Superresolution and Video Transmission," U.S. Pat. No. 8,520,736, issued Aug. 27, 2013.

{2} J. H. Elton, et al., "Methods and Systems for Up-Scaling a Standard Definition (SD) Video to High Definition (HD) Quality," U.S. Pat. No. 8,639,053, issued Jan. 28, 2014.

{3} L. Hurd, et al., "Methods and Systems for Upscaling a Standard Definition (SD) Video to High Definition (HD) Quality," U.S. Pat. No. 8,983,236, issued Mar. 17, 2015.

{4} L. Hurd, et al., "Systems and Methods for Upscaling Video," U.S. Pat. No. 9,432,616, issued Aug. 30, 2016.

For purposes of illustration, application programs and other executable program components such as the operating system may be illustrated herein as discrete blocks, although it is recognized that such programs and components reside at various times in different storage components of the computing device, and are executed by the data processor(s) of the computer. An implementation of media manipulation software can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I hereby claim:

1. An improved method for transmission of a source video over a network having limited transmission bandwidth, the source video having a plurality of sequentially-ordered frames of images in an uncompressed format and having an original spatial sample rate, the method comprising:

For each of the sequentially-ordered frames of images of the source video, generating one or more edge contour reconstruction filter instances associated therewith, wherein each of the one or more edge contour reconstruction filter instances encodes high frequency spectral content of the associated frame, each encoded frame defining a stage one compression data file associated with a respective stage one image frame of the source video;

Downsampling the source video to remove high-frequency spectral content from each of the sequentially-ordered frames of images;

Compressing each of the sequentially-ordered frames of images of the downsampled source video using a lossy codec so that the compressed video has a reduced spatial sample rate lower than the original spatial sample rate and is smaller in size than the source video, each downsampled and compressed frame defining a stage two compression data file associated with a respective stage two image frame of the source video;

Interleaving the stage one compression data files with the stage two compression data files to define a compressed video packet associated with each stage one and stage two image frames, the compressed video packet having a smaller data file size than that of the corresponding, uncompressed image frame of the source video;

Transmitting one or more of the compressed video packets associated with the source video from a transmitter at a first location, over the network having limited transmission bandwidth, to a receiver at a second location;

After receipt of one or more of the compressed video packets by the receiver, deinterleaving the compressed video packet to separate the stage one and stage two compression data files associated with each respective stage one and stage two image frame of the source video;

Decompressing each stage two compression data file using the lossy codec;

Upsampling the decompressed stage two compression data file to define a preliminary reconstructed frame associated with the corresponding frame of the source video, the preliminary reconstructed frame having a predetermined resolution less than the source resolution;

Extracting each of the one or more edge contour reconstruction filter instances from the stage one compression data file to obtain the high frequency spectral content associated with each respective frame of the source video;

Associating the extracted high frequency spectral content associated with each respective frame of the source video with its corresponding preliminary reconstructed frame;

Applying photometric warp superresolution processing to each preliminary reconstructed frame to restore the high frequency spectral content associated therewith and to generate an output video defined as a full-Nyquist reconstruction of each respective frame of the source video; and Displaying the output video to a viewer at the second location.

2. The method of claim 1 wherein the step of generating one or more edge contour reconstruction filter instances associated with each of the sequentially-ordered frames of images comprises applying a nonlinear filter transformation to each of the sequentially-ordered frames of images, the output of which is a pattern manifold assembly (PMA) representation, wherein the PMA representation is an analytic image representation in which edge contours of the respective frame are emphasized.

3. The method of claim 2 wherein the one or more edge contour reconstruction filter instances are extracted from corresponding PMA representations.

4. The method of claim 2 wherein a gradient tracking loop provides an adaptive noise minimum threshold for selecting and discarding PMA representations.

5. The method of claim 1 wherein each edge contour reconstruction filter instance identifies a respective edge contour defined by its coordinate localization, curvilinear geometry, and orientation.

6. The method of claim 1 wherein each stage one compression data file includes descriptor fields associated with each of the one or more edge contour reconstruction filter instances associated with the respective frame and identification of the respective edge contour associated with each corresponding edge contour reconstruction filter instance.

7. The method of claim 1 wherein each stage one compression data file includes x,y coordinates associated with each respective edge contour reconstruction filter instance associated with the respective frame along with variable values necessary for full-Nyquist reconstruction of the respective frame of the source video at the source resolution.

8. The method of claim 1 wherein the step of interleaving the stage one compression data files with the stage two compression data files comprises embedding information from the stage one compression data files into one of: lossy-CODEC data fields of the stage two compression data files, extended or auxiliary IPv6 data fields of the compressed video packets, and separate data packets and IP addresses linked with the corresponding stage two compression data files.

9. The method of claim 1 wherein the source video is a pre-recorded video or a live streaming video.

10. The method of claim 1 wherein the source video (i) originates from one of a plurality of first locations and is transmitted to a single second location, (ii) originates from a single first location and is transmitted to one or more second locations, or (iii) is a shared conference video originating from and transmitted between a plurality of first and second locations.

* * * * *